United States Patent [19]
Schlosser et al.

[11] Patent Number: 5,630,962
[45] Date of Patent: *May 20, 1997

[54] 2-FLUOROPYRIDINES, THEIR PREPARATION AND THEIR USE IN LIQUID CRYSTAL MIXTURES

[75] Inventors: Hubert Schlosser, Glashütten/Taunus; Rainer Wingen, Hattersheim am Main; Gerd Illian, Frankfurt am Main; Claus Escher, Mühltal, all of Germany

[73] Assignee: Hoechst Aktiengesellschaft, Frankfurt, Germany

[*] Notice: The portion of the term of this patent subsequent to Jun. 7, 2013, has been disclaimed.

[21] Appl. No.: 439,446

[22] Filed: May 11, 1995

Related U.S. Application Data

[63] Continuation of Ser. No. 66,152, filed as PCT/EP91/02436, Dec. 18, 1991, published as WO92/11241, Jul. 9, 1992, abandoned.

[30] Foreign Application Priority Data

Dec. 19, 1990 [DE] Germany .................. 40 40 575.3
Apr. 9, 1991 [DE] Germany .................. 41 11 461.2

[51] Int. Cl.$^6$ ............... C09K 19/34; C09K 19/32; C07D 239/02; C07D 211/70
[52] U.S. Cl. ............ 252/299.61; 546/339; 546/345; 544/224; 544/298; 544/242; 252/299.62
[58] Field of Search ............ 252/299.61, 299.62; 546/339, 345; 544/224, 242, 298

[56] References Cited

U.S. PATENT DOCUMENTS

| | | | |
|---|---|---|---|
| 4,684,477 | 8/1987 | Sugimori et al. | 252/299.61 |
| 4,723,018 | 2/1988 | Shionozaki et al. | 546/342 |
| 4,879,060 | 11/1989 | Shionozaki et al. | 252/299.61 |
| 4,952,335 | 8/1990 | Furukawa et al. | 252/299.61 |
| 5,167,859 | 12/1992 | Wachtler et al. | 252/299.61 |
| 5,196,141 | 3/1993 | Wachtler et al. | 252/299.61 |
| 5,205,962 | 4/1993 | Coates et al. | 252/299.61 |
| 5,284,956 | 2/1994 | Buchecker et al. | 546/339 |
| 5,389,291 | 2/1995 | Reiffenrath et al. | 252/299.61 |
| 5,445,763 | 8/1995 | Schlosser et al. | 252/299.61 |

FOREIGN PATENT DOCUMENTS

| | | |
|---|---|---|
| 0158137 | 10/1985 | European Pat. Off. . |
| 4029165 | 3/1992 | Germany . |
| 2-169537 | 6/1990 | Japan . |
| 9209576 | 6/1992 | WIPO . |

OTHER PUBLICATIONS

Reiffenrath et al. "New Liquid Crystalline Compounds with Negative Dielectric Anisotropy", p. 54, 1983.
Geelhaar, "Ferroelectric Mixtures and their Physico–Chemical Properties", L 4., 1982.
Eidenschink et al. "Parameter Characteristics of a Compound with Polarisation Sign Reversal", p. 22, 1984.

Primary Examiner—Cynthia Harris Kelly
Attorney, Agent, or Firm—Curtis, Morris & Safford, P.C.

[57] ABSTRACT

2-Fluoropyridines, processes for their preparation and their use in ferroelectric liquid crystal mixtures A 2-fluoropyridine of the formula (I)

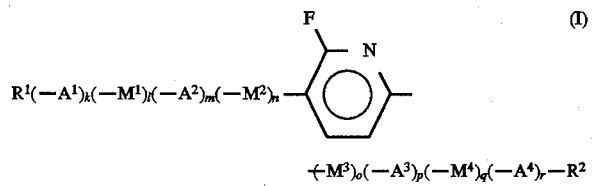

in which the symbols have the following meaning:
$R^1$, $R^2$, independently of one another, are, for example, H or straight-chain or branched alkyl, $A^1$, $A^2$, $A^3$, $A^4$, identical or different, are, for example, 1-phenylene, pyrazine-2,5-diyl or trans-1,4-cyclohexylene, $M^1$, $M^2$, $M^3$, $M^4$, identical or different, are, for example, —O— or —CO—O—, $R^3$, $R^4$, $R^6$, $R^7$, independently of one another, are, for example, H or straight-chain or branched alkyl, $M^5$ is, for example, —O—CO— or a single bond, k, l, m, n, o, p, q, r are zero or one, with the proviso that the sum of k+m+p+r is less than 4 and greater than zero, can advantageously be used as a component in ferroelectric liquid crystal mixtures.

18 Claims, No Drawings

2-FLUOROPYRIDINES, THEIR PREPARATION AND THEIR USE IN LIQUID CRYSTAL MIXTURES

This application is a continuation of application Ser. No. 08/066,152, filed as PCT/EP91/02436, Dec. 18, 1991, published as WO92/11241, Jul. 9, 1992, abandoned.

The unusual combination of anisotropic and fluid behavior of liquid crystals has led to their use in electrooptical switching and display devices. Their electrical, magnetic, elastic and/or thermal properties can be utilized for changes in orientation. Optical effects can be achieved, for example, by means of birefringence, incorporation of dichroic absorbing dye molecules ("guest-host mode") or light scattering.

In order to fulfil the ever-increasing demands in practice in the various areas of application, there is a constant need for novel improved liquid crystal mixtures and thus also for a large number of mesogenic compounds of different structures. This is not only true for the areas in which nematic LC phases are used but also for those utilizing smectic LC phases.

In recent years, ferroelectric liquid-crystalline mixtures (FLC mixtures) have gained particular interest (see, for example, Lagerwall et al., "Ferroelectric Liquid Crystals for Display", SID Symposium, October Meeting 1985, San Diego, Calif., USA). For practical use of ferroelectric liquid crystals in electrooptical displays, chiral, tilted smectic phases, such as, for example, $S_c$ phases, are required [see R. B. Meyer, L. Liebert, L. Strzelecki and P. Keller, J. Physique 36, L-69 (1975)], which are stable over a wide temperature range. This goal can be achieved by means of compounds which themselves form such phases, for example $S_c$ phases, or else by doping compounds forming non-chiral tilted smectic phases with optically active compounds [see M. Brunet, Cl. Williams, Ann. Phys. 3, 237 (1978)].

When using ferroelectric liquid crystal mixtures in electrooptical structural elements, a uniform planar orientation of the liquid crystals is necessary for achieving a high contrast ratio. It has been found that a uniform planar orientation in the $S_c$ phase can be achieved if the phase sequence of the liquid crystal mixture with decreasing temperature is as follows: isotropic→nematic→smectic A→smectic C (see, for example, K. Flatischler et al., Mol. Cryst. Sig. Cryst. 131, 21 (1985); T. Matsumoto et al., p. 468–470, Proc. of the 6th Int. Display Research Conf., Japan Display, 30 Sep. –2 Oct. 1986, Tokyo, Japan; M. Murakami et al., ibid. p. 344–347).

For ferroelectric (chirally smectic) liquid crystal mixtures, an additional condition must be fulfilled, namely that the pitch of the helix in the $S*_c$ phase is large, i.e. greater than 5 μm, and in the N* phase very large, i.e. greater than 10 μm or infinite.

The optical switching time τ[μs] of ferroelectric liquid crystal systems, which should be as short as possible, depends on the rotational viscosity of the system γ[mPas], the spontaneous polarization $P_S$[nC/cm$^2$] and the electrical field strength E[V/m] in accordance with the relationship $$\tau = \frac{\gamma}{P_s \cdot E}$$

Since the field strength E is fixed by the electrode spacing in the electrooptical component and by the voltage applied, the ferroelectric display medium must have low viscosity and high spontaneous polarization in order to achieve a short switching time.

Finally, apart from thermal, chemical and photochemical stability, low optical anisotropy Δn, preferably ≈0.13, and low positive or, preferably, negative dielectric anisotropy Δε are required (see S. T. Lagerwall et al., "Ferroelectric Liquid Crystals for Displays" SID Symposium, October Meeting 1985, San Diego, Calif., USA).

These requirements as a whole can only be fulfilled by providing mixtures comprising a plurality of components. Compounds which serve as a base (or matrix) are preferably those which themselves, if possible, already exhibit the desired phase sequence I→N→$S_A$→$S_c$. Further components are often added to the mixture for decreasing the melting point and for broadening the $S_c$ phase and, in most cases, also the N phase, for inducing optical activity, for compensating pitch and for adjusting optical and dielectric anisotropy, which, however, should, if possible, not lead to an increase in, for example, rotational viscosity.

Individual examples of these components and also certain mixtures have already been disclosed in the prior art. However, since the development of, in particular, ferroelectric liquid crystal mixtures can by no means be regarded as having already come to an end, the manufacturers of displays are interested in different mixtures. The reason for this is, among other things, that only the interaction of the liquid-crystalline mixtures with the individual components of the display devices or the cells (for example the orientation layer) allows conclusions regarding the quality of the liquid-crystalline mixtures too.

EP-B 0,158,137 provides a general description of 4-fluoropyrimidines as compounds and as mixing components. However, they show no or only a slight tendency to form smectic phases and are therefore used in nematic mixtures.

DE-A 4,029,165 and DE-A 4,030,582 present 4-fluoropyrimidines as components for ferroelectric liquid crystal mixtures.

Furthermore, it is known to use mono- and difluorophenyl compounds as components of liquid crystal mixtures (JP-A 2169-537; V. Reiffenrath, The Twelfth International Liquid Crystal Conference, Freiburg, 15–19 Aug. 1988). However, some of these compounds do not exhibit an $S_c$phase. Furthermore, owing to fluorophobic interactions, miscibility problems with mixing components of different structure, for example phenylpyrimidines, often arise. Pyridine derivatives likewise exhibit liquid-crystalline behavior with the formation of an $S_c$ phase (T. Geelhaar, 1st International Symposium on Ferroelectric Liquid Crystal, Arcachon, 2–23 Sep. 1987; U.S. Pat. No. 4,952,335). However, an $S_1$ phase often occurs in these compounds and impairs their use in ferroelectric liquid crystal mixtures.

The present invention relates to novel 2-fluoropyridine derivatives and to their use as components for ferroelectric liquid crystal mixtures, at least one 2-fluoropyridine of the formula (I) being used as a component in a liquid crystal mixture.

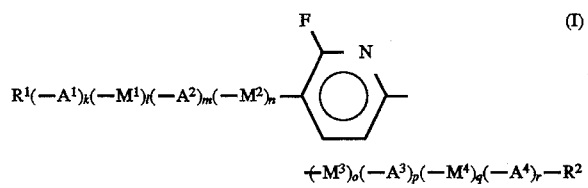

These symbols have the following meaning:

$R^1$, $R^2$, independently of one another, are H, F, Cl, CN, NCS, —CF$_3$, —OCF$_3$, —OCHF$_2$ or straight-chain or branched (with or without the inclusion of an asymmetric carbon atom) alkyl having 1 to 16 carbon atoms, it also being possible for one or two non-adjacent —CH$_2$— groups to be replaced by —O—, —S—, —CO—, —CO—O—, —O—CO—, —CO—S—, —S—CO—, —O—CO—O—, —CH=CH—, —C≡C—, Δ or —Si(CH$_3$)$_2$—, and it also being possible for one or more hydrogen atoms of the alkyl radical to be substituted by F, Cl, Br or CN, or are one of the following chiral groups:

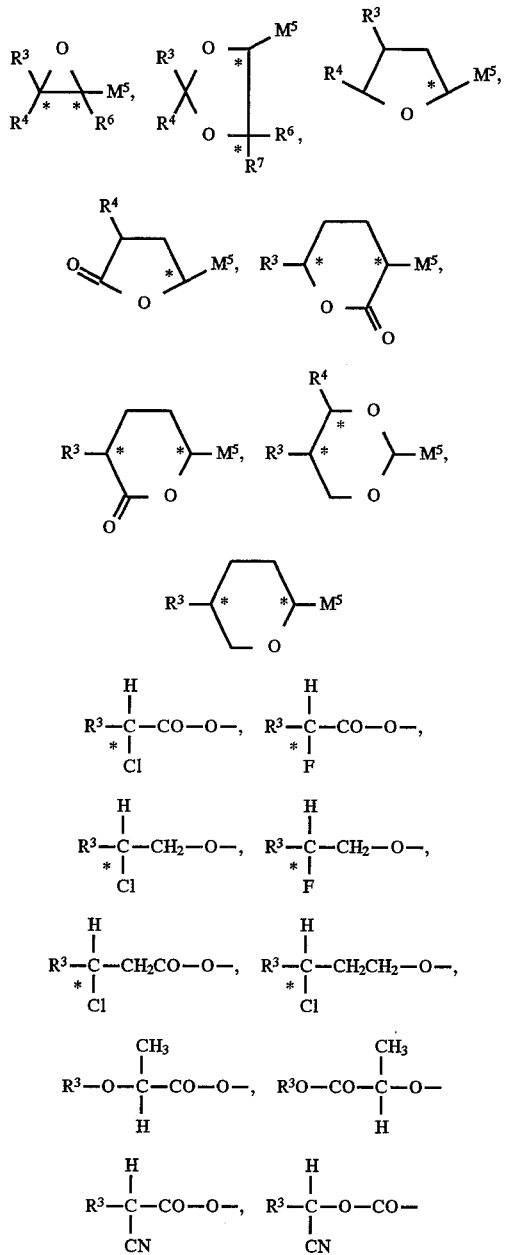

A$^1$, A$^2$, A$^3$, A$^4$, identical or different, are 1,4-phenylene, pyrazine-2,5-diyl, pyridazine-3,6-diyl, pyridine-2,5-diyl, pyrimidine-2,5-diyl, it being possible for one or two hydrogen atoms to be replaced by F, trans-1,4-cyclohexylene, in which one or two hydrogen atoms can be replaced by CN, 1,3,4-thiadiazole-2,5-diyl, 1,3-dioxane-2,5-diyl, naphthalene-2,6-diyl, bicyclo[2.2.2]-octane-1,4-diyl or 1,3-dioxaborinane-2,5-diyl;

M$^1$, M$^2$, M3, M$^4$, identical or different, are —O—, —S—, —CO—, —CO—O—, —O—CO—, —CO—S—, —S—CO—, —O—CO—O—, —CH$_2$—O—, —O—CH$_2$—, —CH$_2$—CH$_2$—, —CH=CH— or —C≡C—;

R$^3$, R$^4$, R$^6$, R$^7$, independently of one another, are H or straight-chain or branched alkyl having 1 to 16 carbon atoms or R$^3$ and R$^4$ together are also —(CH$_2$)$_4$—, or —(CH$_2$)$_5$— if bound as substituents to a dioxolane system, M$^5$ is —CH$_2$—O—, —CO—O—, —O—CH$_2$—, —O—CO— or a single bond, k, l, m, n, o, p, q, r are zero or one, with the proviso that the sum of k+m+p+r is less than 4 and greater than zero.

In a preferred embodiment of the invention, the symbols have the following meaning:

R$^1$, R$^2$, independently of one another, are H, F, CN or straight-chain or branched (with or without the inclusion of an asymmetric carbon atom) alkyl having 1 to 16 carbon atoms, it also being possible for one —CH$_2$— group to be replaced by —O—, —S—, —CO—, —CO—O—, —O—CO—, —O—CO—O—, —CH=CH—, —C≡C—, Δ or —Si(CH$_3$)$_2$—, or are one of the following chiral groups:

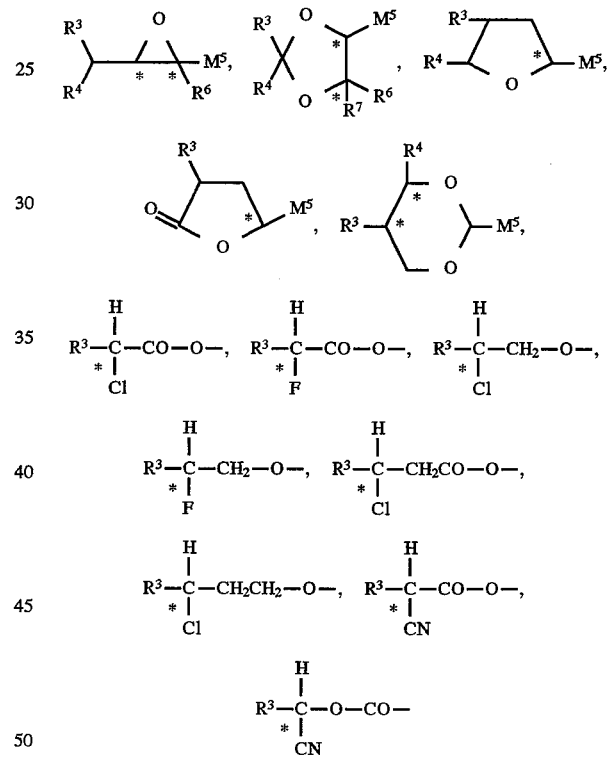

A$^1$, A$^2$, A$^3$, A$^4$, identical or different, are 1,4-phenylene, pyrazine-2,5-diyl, pyridazine-3,6-diyl, pyridine-2,5-diyl, pyrimidine-2,5-diyl, it being possible for one or two hydrogen atoms to be replaced by F, trans-1,4-cyclohexylene, 1,3,4-thiadiazole-2,5-diyl, 1,3-dioxane-2,5-diyl, naphthalene-2,6-diyl, bicyclo[2.2.2]octane-1, 4-diyl or 1,3-dioxaborinane-2,5-diyl;

M$^1$, M$^2$, M$^3$, M$^4$, identical or different, are —O—, —CO—, —CO—O—, —O—CO—, —CH$_2$—O—, —O—CH$_2$—, —CH$_2$—CH$_2$—, —CH=CH— or —C≡C—;

R$^3$, R$^4$, R$^6$, R7, independently of one another, are H or straight-chain or branched alkyl having 1 to 10 carbon atoms or R$^3$ and R$^4$ together are also —(CH$_2$)$_4$—, or —(CH$_2$)$_5$— if bound as substituents to a dioxolane system;

$M^5$ is —$CH_2$—O—, —CO—O—, —O—$CH_2$—, —O—CO— or a single bond.

Furthermore, preference is given to 2-fluoropyridine derivatives in which the symbols have the following meaning:

$R^1$, $R^2$, independently of one another, are H, F, CN or straight-chain or branched (with or without the inclusion of an asymmetric carbon atom) alkyl having 1 to 16 carbon atoms, it also being possible for one —$CH_2$—group to be replaced by —O—, —CO—, —CO—O—, —O—CO—, —CH=CH—, Δ or —Si$(CH_3)_2$—, or are one of the following chiral groups:

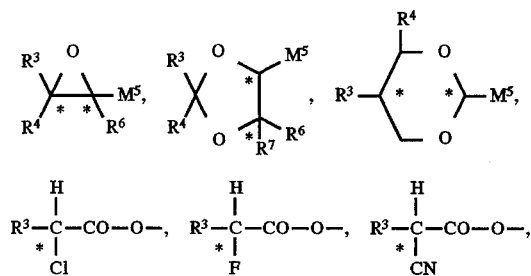

$A^1$, $A^2$, $A^3$, $A^4$, identical or different, are 1,4-phenylene, pyrazine-2,5-diyl, pyridazine-3,6-diyl, pyridine-2,5-diyl, pyrimidine-2,5-diyl, in which one or two hydrogen atoms can be replaced by F, trans-1,4-cyclohexylene, 1,3-dioxane-2,5-diyl, naphthalene-2,6-diyl or 1,3-dioxaborinane-2,5-diyl;

$M^1$, $M^2$, $M^3$, $M^4$, identical or different, are —O—, —CO—O—, —O—CO—, —O—$CH_2$—, —$CH_2$—$CH_2$— or —CH=CH—;

$R^3$, $R^4$, $R^6$, $R^7$, independently of one another, are H or straight-chain or branched alkyl having 1 to 10 carbon atoms or $R^3$ and $R^4$ together are also —$(CH_2)_4$—, or —$(CH_2)_5$— if bound as substituents to a dioxolane system;

$M^5$ is —$CH_2$—O—, —CO—O—, —O—$CH_2$—, —O—CO— or a single bond.

Preference is given in particular to a 2-fluoropyridine in which $R^1$, $R^2$, independently of one another, are H or alkyl having 1 to 16 carbon atoms, it also being possible for one —$CH_2$— group to be replaced by —O—, —CO—O— or —O—CO—, or are the chiral group

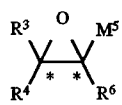

$A^1$, $A^2$, $A^3$, $A^4$, identical or different, are 1,4—phenylene, pyrazine-2,5-diyl, pyridazine-3,6-diyl, pyridine-2,5-diyl, pyrimidine-2,5-diyl, in which one or two hydrogen atoms can be replaced by F, trans-1,4-cyclohexylene, 1,3-dioxane-2,5-diyl, naphthalene-2,6-diyl or 1,3-dioxaborinane-2,5-diyl;

$M^1$, $M^2$, $M^3$, $M^4$, identical or different, are —O—, —CO—O—, —O—CO—, —$OCH_2$— or —$CH_2$O—;

$R^3$, $R^4$, $R^6$, independently of one another, are H or a straight-chain alkyl having 1 to 10 carbon atoms;

$M^5$ is —$CH_2$—O— or —CO—O—.

The compounds according to invention are chemically and photochemically stable. They have low melting points and in general exhibit broad liquid-crystalline phases, in particular broad nematic, smectic A and smectic C phases.

Liquid-crystalline compounds containing this structural element can be used for preparing not only ferroelectric mixtures but also nematic and also chirally nematic mixtures which are suitable for use in electrooptical or completely optical elements, for example display elements, switching elements, light modulators, elements for image processing, signal processing or, in general, in the area of nonlinear optics.

A particular advantage of these components lies in their negative dielectric anisotropy which is particularly favorable in AC field stabilizations when applying ferroelectric liquid crystals (see, for example, 1983 SID report by AT & T, JP-A 245,142/1986, JP-A 246,722/1986, JP-A 246,723/1986).

Furthermore, nematic mixtures exhibiting large negative dielectric anisotropy are required for displays based on the ECB or CSH principle (see, for example, S. Yamauchi et al., SID 1989 Digest, page 378 or M. F. Schiekel and K. Fahrensohn, Appl. Phys. Lett., p. 391 (1971)). Owing to their broad nematic phase, their low viscosity and their large negative dielectric anisotropy, the fluoropyridine derivatives are suitable for these nematic mixtures as main component or as admixture.

The object is also achieved by a liquid-crystalline, in particular a ferroelectric liquid-crystalline, mixture containing at least one compound of the formula (I). However, in principle, the 2-fluoropyridines mentioned are also suitable as components for nematic liquid crystal mixtures and for use in nematic displays.

The liquid crystal mixtures in general comprise 2 to 20, preferably 2 to 15, components including at least one of the compounds claimed according to the invention. The other components are preferably selected from known compounds exhibiting nematic, cholesteric and/or tilted smectic phases which include, for example, Schiff bases, biphenyls, pyridines, thiadiazoles, difluorophenyls, terphenyls, phenylcyclohexanes, cyclohexylbiphenyls, pyrimidines, cinnamic esters, cholesterol esters and multinuclear esters of p-alkylbenzoic acids. In general, the commercially available liquid crystal mixtures are already present as mixtures of different components, at least one of which is mesogenic, before the compound(s) according to the invention is (are) added.

The liquid crystal mixtures in general contain the 2-fluoropyridine derivative(s) according to the invention in an amount of 0.1 to 70 mol %, preferably 0.5 to 50 mol %, in particular 1 to 25 mol %.

For the ready-to-use ferroelectric liquid crystal mixtures the values for spontaneous polarization $P_s$[nC/cm$^2$], contrast C and optical switching time τ[μs] were determined, all measurements being carried out at a temperature of 25° C.

The $P_2$ values are measured by the method of H. Diamant et al. (Rev. Sci. Instr., 28, 30, 1957), in which measurement cells having an electrode spacing of 2 μm and rubbed polyimide as the orientation layer are used. To determine τ and C, the measurement cell is mounted on the revolving stage of a polarizing microscope between crossed analyzer and polarizer. To determine the contrast (C), the measurement cell is rotated until it reaches a position in which a photodiode shows minimum light transmission (dark state). The lighting of the microscope is regulated in such a manner that the photodiode shows the same light intensity for all cells. A switching process changes the light intensity (bright state), and the contrast is calculated from the ratio of the light intensities of these states.

To determine τ and the switching angle $\phi_{eff}$, the stage is rotated until it reaches the position in which both switching states in the cell show minimum light transmission. The difference between the two positions of the revolving stage is equal to twice the effective tilting angle. The switching time τ is determined by means of a photodiode by measuring the rise time of the light signal from 10 to 90% of the signal height. The switching voltage is composed of square pulses and is ±10 V/ μm.

The phase transition temperatures are determined during heating by monitoring the changes in texture using a polarizing microscope. In contrast, the melting point was determined using a DSC apparatus. The phase transition temperatures between the phases nematic (N or N*)

smectic C ($S_c$ or $S_c$*)

smectic A ($S_A$ or $S_A$*)

crystalline (X)

are given in °C, the values being written between the phase designations in the phase sequence.

Liquid-crystalline mixtures containing compounds of the formula (I) are suitable in particular for use in electrooptical switching and display devices. Switching and display devices (LC displays) contain, inter alia, the following components: a liquid-crystalline medium, base plates (for example made of glass or plastic) coated with transparent electrodes, at least one orientation layer, spacers, adhesive frame, polarizers and, in the case of color displays, thin color filter films. Further possible components are antireflection, passivating, compensating and barrier layers and non-linear electrical elements, such as, for example, thin-film transistors (TFT) and metal/isolator/metal (MIM) elements. The structure of liquid crystal displays has already been described in detail in relevant monographies (for example E. Kaneko, "Liquid Crystal TV Displays: Principles and Applications of Liquid Crystal Displays", KTK Scientific Publishers, 1987, pages 12–30 and 63–172).

The compounds according to the invention can be prepared by the methods A and B shown in schemes 1 to 5. The basic difference between the two methods is that in method A a pyridine derivative which already contains the mesogenic basic structure, including the wing groups, is fluorinated in the position adjacent to the pyridine nitrogen by suitable reactions, while in method B an already fluorinated pyridine is successively provided with further mesogenic units and the wing groups by suitable reactions.

Accordingly, the invention relates not only to a process for the preparation of a 2-fluoropyridine of the formula (I) by fluorination of a pyridine derivative of the formula (A) in the 2 position on the pyridine ring,

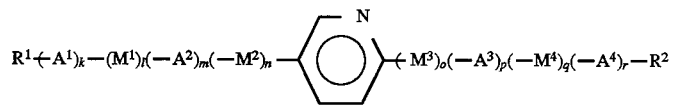

(A)

but also to a process in which, starting with 2-bromo-6-fluoropyridine or 2,6-difluoropyridine, the side chains $R^1(-A^1)_k(-M^1)_1(-A^2)_m(-M^2)_n-$ and $-(M^3)_o(-A^3)_p-(M^4)_q-(A^4)_r-R^2$ are incorporated in the 3 and 6 positions of the pyridine ring by a multistep reaction.

Method A shown in scheme 1 starts with 2,5-disubstituted pyridines of the formula (II), which can be prepared by methods known per se from the literature (for example C. S. Giam, J. Stout, Chem. Commun. 478 (1970); P. Doyle, R. R. Yates, Tetrahedron Lett. 3371 (1970); A. I. Pavljucenko et al., Z. Org. Chem. 22 (1986), 1061). The pyridine derivatives of the formula (II) can be converted into the N oxide (formula (III)) by reaction with a percarboxylic acid, for example performic acid, peracetic acid, perbenzoic acid, 3-chloroperbenzoic acid. The compounds of the formula (III) can be converted into the pyridones of the formula (IV) by treatment with a carboxylic anhydride, followed by alkaline workup. The 2-fluoropyridine derivatives of the formula (I) are directly available, starting from pyridones of the formula (IV), by reaction of the latter with a fluorinating agent, such as, for example, aminofluorosulfuranes (for example diethylaminosulfur trifluoride) or sulfur tetrafluoride.

Alternatively, pyridones of the formula (IV) can be converted into the corresponding 2-halopyridines of the formula (V) using a halogenating agent, such as, for example, phosphorus trichloride, phosphorus oxytrichloride, phosphorus pentachloride and their bromine and iodine analogs. Nucleophilic exchange of the halogen substituents for fluorine with the aid of a fluoride reagent, such as, for example, silver fluoride, sodium fluoride, potassium fluoride or cesium fluoride, also leads to 2-fluoropyridines of the formula (I).

Scheme 1

(Method A)

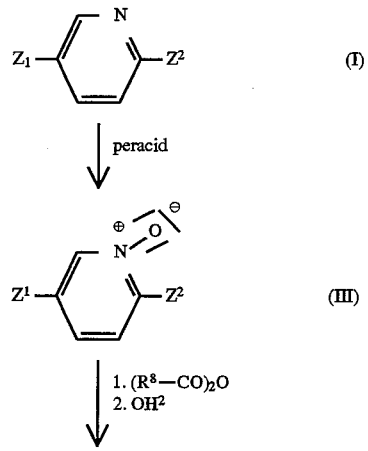

-continued
Scheme 1

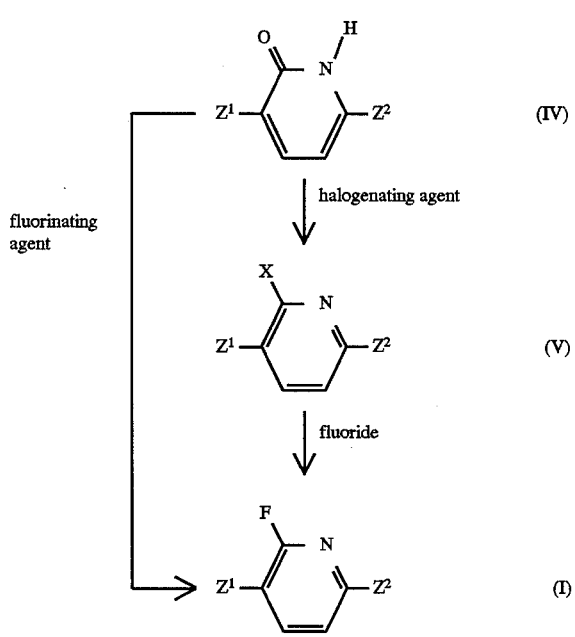

$Z^1$ is $R^1(-A^1)_k(-M^1)_l(-A^2)_m(-M^2)_n-$
$Z^2$ is $(-M^3)_o(-A^3)_p(-M^4)_q(-A^4)_r-R^2$
X is Cl, Br, I $R^8$ is straight -chain or branched alkyl having C atoms.

The first starting compound of method B outlined in schemes 2 to 5 is the commercially available 2,6-difluoropyridine (formula (VI)). Exchange of a fluorine substituent in (VI) for a grouping of the formula $Z^2$ (—$M^3$)$_o$(—$A^3$)$_p$(—$M^4$)$_q$(—$A^4$)$_r$—$R^2$ by reaction with a metal compound of $Z^2$, for example a lithium compound, sodium compound, potassium compound or magnesium compound at temperatures of between –40° and 100° C., in particular between –10° and 70° C., in an inert reaction medium, for example diethyl ether, tetrahydrofuran, 1,4-dioxane, ethylene glycol diethyl ether or diethylene glycol diethyl ether leads to compounds of the formula (IX).

The second starting compound of method B is the also commercially available 2,6-dibromopyridine (formula (VII) ). Reaction of 2,6-dibromopyridine with 1 to 3, in particular 1.5 to 2.5, mole equivalents of a fluoride reagent, such as, for example, silver fluoride, sodium fluoride, potassium fluoride or cesium fluoride, at temperatures of between 50° and 250° C., in particular between 100° and 200° C., and a pressure of between 50 and 300 mmHg, in particular between 100 and 200 mmHg, using catalytic amounts (1 to 20 mol percent, in particular 5 to 15 mol percent) of a complexing agent, such as, for example, 18-crown-6, dibenzo-18-crown-6 or 1,10-diaza-4,7,13,16,21,24-hexaoxabicyclo [8.8.8]hexacosane gives 2-bromo-6-fluoropyridine (VIII).

Crosscoupling of compound (VIII) with organometallic derivatives of $Z^2$, for example Grignard derivatives, lithium derivatives and zinc derivatives, and boronic acids of $Z^2$ using transition metal catalysts, for example dichloro[1,3-bis(diphenylphosphino)propane]nickel(II) and tetrakis (triphenylphosphine)palladium(0), at temperatures of between –40° and 200° C., in particular between –10° and 100° C., in reaction media, such as, for example, benzene/ ethanol/water for the reaction with boronic acids of $Z^2$ and, for example, diethyl ether or tetrahydrofuran for the reaction with Grignard derivatives, lithium derivatives and zinc derivatives of $Z^2$, also provides compounds of type (IX).

2-Fluoropyridines of type (IX) can be converted into 2-fluoro-3-lithiopyridines of the formula (X) by treatment with a lithium compound, such as, for example, alkyl lithium compounds or lithium amides, at temperatures of between –40° and –100° C., in particular between –60° and –80° C., in an inert reaction medium, for example diethyl ether, tetrahydrofuran or ethylene glycol diethyl ether. 3-Lithiopyridines of the formula (X) are available for reaction with electrophilic compounds giving 2-fluoropyridines of the formula (I) either directly or via further intermediates (compounds of the formulae (XI), (XII), (XIII), (XIV), (XV) and (XVI)).

Thus, the reaction of compounds of type (X) with halides, nitriles, carbonyl halides and formylmethyl derivatives of $Z^3$ at temperatures of between –40° and –100° C., in particular between –60° and –80° C., in an inert reaction medium, for example diethyl ether, tetrahydrofuran or ethylene glycol diethyl ether, leads directly to 2-fluoropyridines of the formula (I). Olefinic 2-fluoropyridines (I) can be converted into saturated species (I) by hydrogenation of the olefinic double bond using methods known per se from the literature (see, for example, Houben-Weyl, Methoden der Organischen Chemie [Methods of Organic Chemistry], Georg Thieme Verlag, Stuttgart).

The reaction of 2-fluoro-3-lithiopyridines (X) with halogens, for example chlorine, bromine or iodine, at temperatures of between –40° and –100° C., in particular between –60° and –80° C., in an inert reaction medium, for example diethyl ether, tetrahydrofuran or ethylene glycol diethyl ether, leads to 2-fluoro-3-halopyridines of the formula (XI). Crosscoupling of compounds of type (XI) with organometallic derivatives of $Z^1$, for example Grignard derivatives, lithium derivatives and zinc derivatives, and boronic acids of $Z^1$ using transition metal catalysts, for example dichloro[1,3-bis(diphenylphosphino)propane] nickel(II) and tetrakis(triphenylphosphine)palladium(0), at temperatures of between –40° and 200° C., in particular between –10° and 100° C., in reaction media, such as, for example, benzene/ethanol/ water for the reaction with boronic acids of $Z^1$ and, for example, diethyl ether or tetrahydrofuran for the reaction with Grignard derivatives, lithium derivatives and zinc derivatives of $Z^1$ gives 2-fluoropyridines (I).

Treatment of 2-fluoro-3-lithiopyridines (X) with carbon dioxide at temperatures of between –40° and –100° C., in particular between –60° and –80° C., in an inert reaction medium, for example diethyl ether, tetrahydrofuran or ethylene glycol diethyl ether, gives 2-fluoro-3-pyridinecarboxylic acids of the formula (XII). Species (XII) can be converted into 2-fluoropyridines (I) by methods known per se from the literature (see, for example, Houben-Weyl, Methoden der Organischen Chemie [Methods of Organic Chemistry], Georg Thieme Verlag, Stuttgart), either directly by esterification with alcohols of $Z^3$ with the aid of suitable condensating agents, for example carbodiimides, or, after reduction to 2-fluoro-3-hydroxymethylpyridines (XIII) with suitable reducing agents, for example complex hydrides, into compounds of the formula (I) by esterification with carboxylic acids or carbonyl halides of $Z^3$ or etherification with alcohols or halides of $Z^3$.

Reaction of 2-fluoro-3-lithiopyridines (X) with formamides at temperatures of between –40° and –100° C., in particular between –60° and –80° C., in an inert reaction medium, for example diethyl ether, tetrahydrofuran or ethylene glycol diethyl ether, gives 2-fluoro-3-formylpyridines (XIV), which, after acid-catalyzed acetalization with 2-$Z^4$-1,3-propanediols by methods known per se from the literature (see, for example, Houben-Weyl, Methoden der Organischen Chemie [Methods of Organic Chemistry], Georg Thieme Verlag, Stuttgart), provide 2-fluoropyridines of type (I).

Successive treatment of 2-fluoro-3-lithiopyridines (X) with trialkylborates at temperatures of between −40° and −100° C., in particular between −60° and −80° C., and aqueous acid at temperatures of between −10° and 50° C., in particular between 10° and 30° C., in an inert reaction medium, for example diethyl ether, tetrahydrofuran or ethylene glycol diethyl ether, gives 2-fluoro-3-pyridineboronic acids of the formula (XV).

Boronic acids (XV) can be subjected to coupling reactions with halides of $Z^3$ using a transition metal catalyst, for example tetrakis(triphenylphosphine)palladium(0), at temperatures of between 30° and 200° C., in particular between 50° and 100° C., in reaction media, such as, for example, benzene/ethanol/water, to give compounds of type (I).

2-Fluoropyridines (I) are moreover obtained from boronic acids (XV) by esterifying them with $2-Z^4-1,3$-propanediols by methods known per se from the literature (see, for example, Houben-Weyl, Methoden der Organischen Chemie [Methods of Organic Chemistry], Georg Thieme Verlag, Stuttgart).

Oxidation of boronic acids (XV) with peroxides, for example hydrogen peroxide, at temperatures of between 10° and 100° C., in particular between 30° and 70° C., in reaction media, such as, for example, diethyl ether or tetrahydrofuran, leads to 2-fluoro-3-hydroxypyridines (XVI), which can be converted by methods known per se from the literature (see, for example, Houben-Weyl, Methoden der Organischen Chemie [Methods of Organic Chemistry], Georg Thieme Verlag, Stuttgart) into 2-fluoropyridines of the formula (I) by esterification with carboxylic acids or carbonyl halides of $Z^3$ or by etherification with alcohols or halides of $Z^3$.

Scheme 2

(Method B):

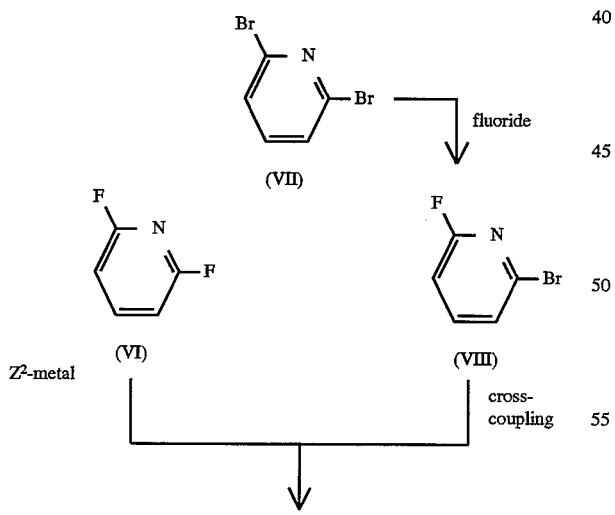

-continued
Scheme 2

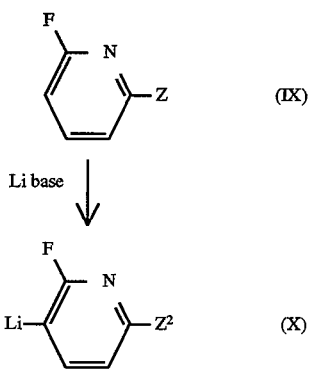

As for $Z^2$, see Scheme 1

Scheme 3
(Method B):
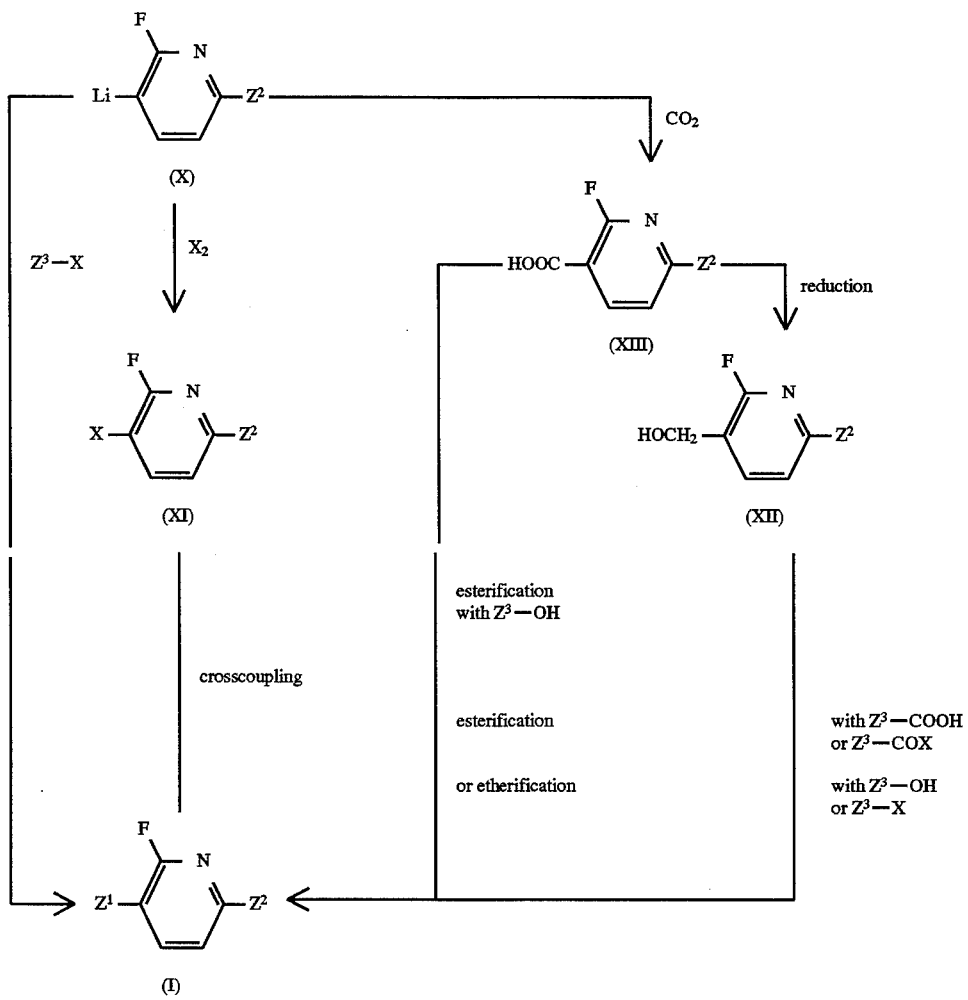
As for $Z^1$, $Z^2$, X, see Scheme 1 $Z^3$ is $R^1(-A^1)_k(-M^1)_1(-A^2)_m-$

Scheme 4
(Method B):
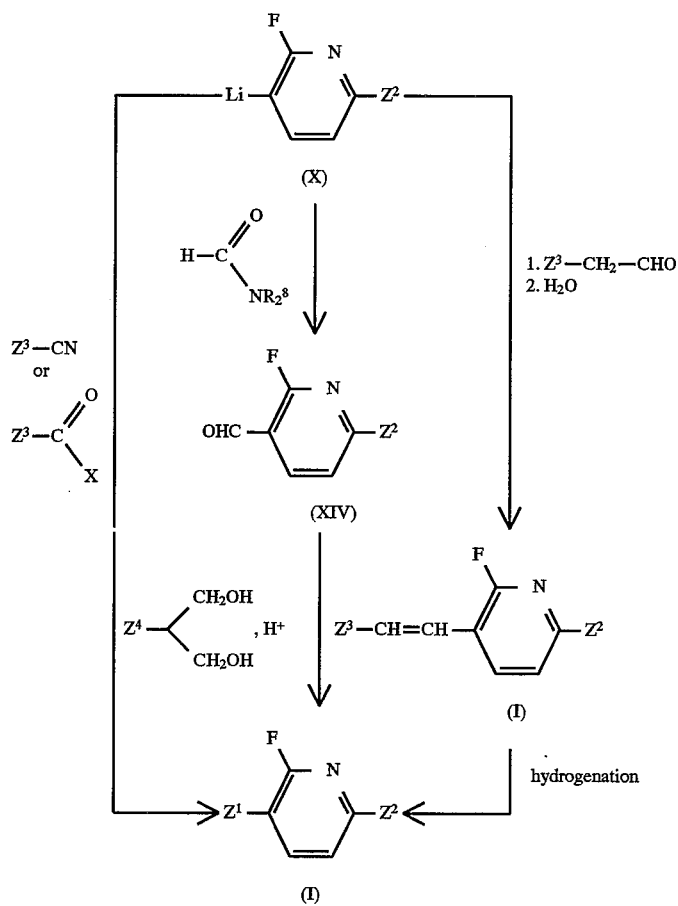
As for $Z^1$, $Z^2$, $Z^3$, $R^6$, X, see Schemes 1 and 3 $Z^4$ is $R^1(-A^1)_k(-M^1)_1-$
Scheme 5
(Method B):
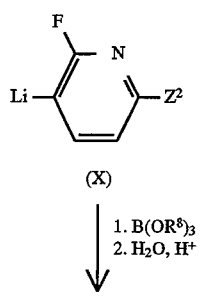

-continued
Scheme 5

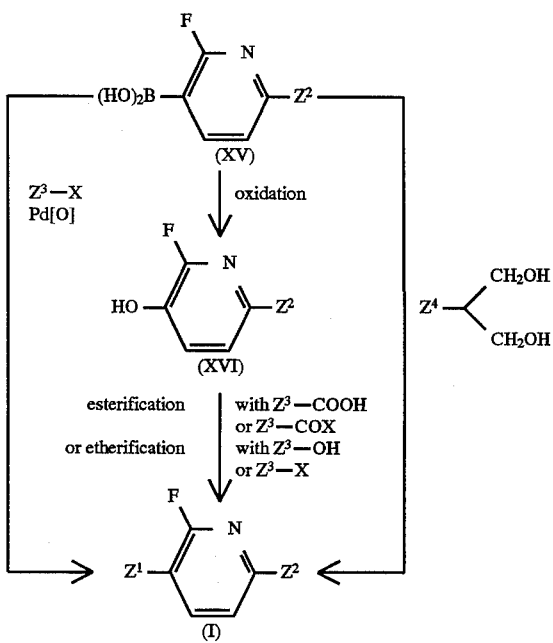

As for $Z^1$, $Z^2$, $Z^3$, $Z^4$, $R^6$, X, see Schemes 1, 3 and 4

The invention is illustrated in more detail by the examples which follow:

EXAMPLE 1

2-Fluoro-3-octyl-6-(4-octyloxyphenyl)pyridine

Preparation by method A:

A solution of 3.03 g (12.3 mmol) of 3-chloroperbenzoic acid in 30 ml of methylene chloride is added dropwise at a temperature of 0° to 5° C. to 3.23 g (8.2 mmol) of 5-octyl-2-(4-octyloxyphenyl)pyridine (prepared, for example, analogously to C. S. Giam, J. Staut, J. Chem. Soc., Chem. Commun. 478 (1970) from pyridine, 4-octyloxyphenyllithium and 1-bromooctane) in 30 ml of methylene chloride. After a reaction time of 3 hours at room temperature, the mixture is washed once with 5% sodium carbonate and twice with sodium chloride solution, the organic phase is dried over sodium sulfate, filtered off, and the solvent is removed by distillation. Purification of the residue by chromatography (silica gel, 8:2 methylene chloride/ethyl acetate) gives 2.20 g of 5-octyl-2-(4-octyloxyphenyl)pyridine N-oxide.

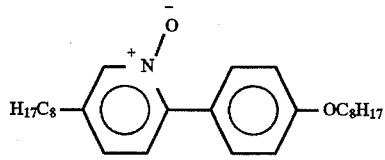

2.20 g (5.4 mmol) of 5-octyl-2-(4-octyloxyphenyl) pyridine N-oxide are refluxed in 30 ml of acetic anhydride for 4 hours. The acetic anhydride is then distilled off, and the residue is taken up in 10 ml of 1:1 methylene chloride/ methanol, and the mixture is stirred with methanolic potassium hydroxide solution for 1 hour. Washing with water and concentrated ammonium chloride solution, drying over sodium sulfate, filtration, removal of the solvent by distillation and recrystallization from 8:2 n-hexane/ethyl acetate give 1.79 g of 3-octyl-6-(4-octyloxyphenyl)-1H-2-pyridone.

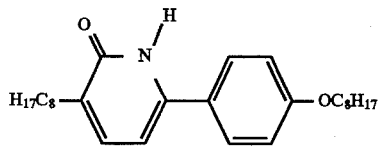

0.32 g (0.8 mmol) of 3-octyl-6-(4-octyloxyphenyl)-1H-2-pyridone are heated together with 15 ml of phosphorus oxytrichloride in a sealed tube at 200° C. for 3 hours. The reaction mixture is poured onto ice water, and the resulting mixture is made basic with sodium carbonate. Extraction of the aqueous phase with methylene chloride, washing of the organic phase with sodium chloride solution, drying over sodium sulfate, filtration, removal of the solvent by distillation and chromatography (silica gel, 8:2 hexane/ethyl acetate) give 0.22 g of 2-chloro-3-octyl-6-(4-octyloxyphenyl)pyridine.

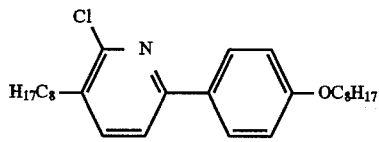

0.20 g (0.5 mmol) of 2-chloro-3-octyl-6-(4-octyloxyphenyl)pyridine is heated together with 0.5 g of potassium fluoride, 0.5 g sodium fluoride and 0.02 g of 18-crown-6 in a sealed tube at 200° C. for 18 hours. The reaction mixture is taken up in ether/water, the organic phase is washed with water, dried over sodium sulfate, filtered, the solvent is distilled off, the residue is purified by chromatography (silica gel, 8:2 hexane/ethyl acetate) and recrystallized from acetonitrile, giving 0.11 g of 2-fluoro-3-octyl-6-(4-octyloxyphenyl ) pyridine.

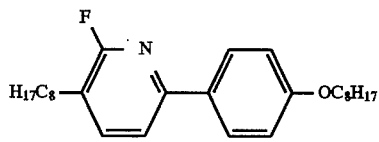

The compound exhibits the following phase sequence:
X 58 $S_c$ 61 I

EXAMPLE 2

2-Fluoro-3-octyl-6-(4-octyloxyphenyl)pyridine

Preparation by method B:

31.38 g (110.0 mmol) of 1-bromo-4-octyloxybenzene in 80 ml of benzene and 81 ml (130.0 mmol) of a 1.6-molar n-butyllithium solution in hexane are stirred at room temperature under argon for 4 hours. The 4-octyloxyphenyllithium formed as a white precipitate is filtered off under argon, washed twice with 20 ml of n-hexane, dried in vacuo and slowly added dropwise as a solution in 60 ml of tetrahydrofuran at 0° C. under argon to a solution of 11.51 g (100.0 mmol) of 2,6-difluoropyridine in 80 ml of tetrahydrofuran. After a reaction time of 1 hour at 0° C., sodium chloride solution is added, the mixture is taken up in ether, the organic phase is washed with sodium chloride solution, dried over sodium sulfate, filtered, the solvent is removed from the filtrate, and the residue is purified by chromatography (silica gel, 9:1 hexane/ethyl acetate), giving 4.00 g of 2-fluoro-6-(4-octyloxyphenyl) pyridine.

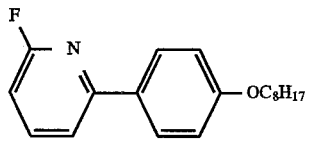

0.74 g (7.3 mmol) of diisopropylamine in 30 ml of tetrahydrofuran is stirred at 0° C. with 4.56 ml (7.3 mmol) of a 1.6-molar n-butyllithium solution in hexane under argon for 1 hour. After cooling to −78° C., 2.00 g (6.64 mmol) of 2-fluoro-6-(4-octyloxyphenyl)pyridine in 30 ml of tetrahydrofuran are added dropwise at such a rate that the temperature does not exceed 70° C. After 4 hours at −78° C., 1.35 g (7.00 mmol) of 1-bromooctane in 10 ml of tetrahydrofuran are added dropwise while also maintaining a temperature ≦−70° C. The reaction mixture is stirred overnight, during which it warms to room temperature, 5 ml of water are added, and the mixture is evaporated to dryness. The residue is taken up in ether, the resulting solution is washed twice with water, the organic phase is dried over sodium sulfate, filtered, the solvent is distilled off, the residue is purified by chromatography (silica gel, 9:1 hexane/ethyl acetate) and recrystallized from acetonitrile, giving 0.10 g of 2-fluoro-3-octyl-6-(4-octyloxyphenyl)pyridine, whose physical properties are identical to those of the product prepared by Example 1.

EXAMPLE 3

2-Fluoro-3-octyloxy-6-(4-octyloxyphenyl)pyridine

Preparation by method B:

4.3 ml (8.6 mmol) of a 2-molar lithium diisopropylamide solution in tetrahydrofuran/hexane/ethylbenzene are added dropwise at −78° C. to 2.36 g (7.8 mmol) of 2-fluoro-6-(4-octyloxyphenyl)pyridine (prepared as described in Example 2) in 180 ml of tetrahydrofuran, and the mixture is stirred for 4 hours. 2.95 g (17.2 mmol) of triisopropyl borate in 10 ml of tetrahydrofuran are then added dropwise at −78° C., and the reaction mixture is stirred overnight, during which it warms to room temperature. After addition of 12.0 ml of 10% hydrochloric acid and stirring at room temperature for i hour, sodium chloride solution is added, the mixture is extracted with ether, the ether phase is washed with sodium chloride solution, dried over sodium sulfate, filtered and concentrated. The residue is taken up in 40 ml of ether, and the resulting mixture is heated to boiling. 8.03 g (23.5 mmol) of a 10% hydrogen peroxide solution are added dropwise, and the reaction mixture is refluxed for 4 hours. After separating off the ether phase, the aqueous phase is extracted with ether. The combined ether phases are washed with sodium sulfite solution and then with sodium chloride solution, dried over sodium sulfate, filtered and evaporated to dryness. Purification of the residue by chromatography (silica gel, 7:3 hexane/ethyl acetate) gives 1.13 g of 2-fluoro-3-hydroxy-6-(4-octyloxyphenyl)pyridine.

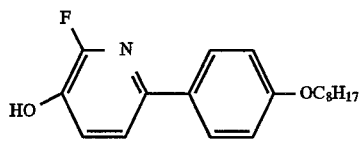

2.00 g (11.5 mmol) of diethyl azodicarboxylate are added dropwise at 0° C. to 3.00 g (11.5 mmol) of triphenylphosphine in 50 ml of tetrahydrofuran, and the mixture is stirred at room temperature for 30 minutes. 2.42 g (7.7 mmol) of 2-fluoro-3-hydroxy-6-(4-octyloxyphenyl)pyridine and 1.00 g (7.7 mmol) of 1-octanol are then added. After a reaction time of 18 hours at room temperature, the solvent is distilled off, and the residue is purified by chromatography (silica gel, 95:5 hexane/ethyl acetate). Recrystallization from acetonitrile gives 1.38 g of 2-fluoro-3-octyloxy-6-(4-octyloxyphenyl)pyridine.

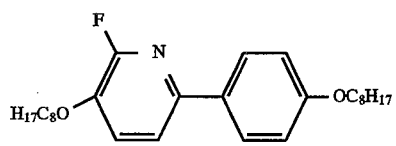

The compound exhibits the phase sequence:
X 81 $S_c$ 88 I

EXAMPLE 4

2-Fluoro-6-(4-octyloxyphenyl)pyridine-3-yl octanoate

Preparation by method B:

1.2 ml (7.1 mmol) of octanoyl chloride are added dropwise at 0° C. to 1.5 g (4.7 mmol) of 2-fluoro-3-hydroxy-6-(4-octyloxyphenyl)pyridine (prepared as described in Example 3) in 20 ml of pyridine, and the mixture is stirred at 0° C. for 3 hours. It is then poured onto ice water, filtered off and the residue is purified by chromatography (silica gel, 9:1 hexane/ethyl acetate) and by recrystallization from acetonitrile, giving 1.34 g of 2-fluoro-6-(4-octyloxyphenyl) pyridine-3-yl octanoate.

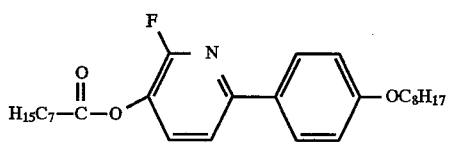

The compound exhibits the phase sequence:
X 63 $S_c$ 76 N 77 I

EXAMPLE 5

2-Fluoro-6-octyloxy-3-(4-octyloxyphenyl)pyridine

Preparation by method B:

Lithium octanolate (previously prepared from 13.02 g (100.00 mmol) of 1-octanol and 69 ml (110.00 mmol) of a 1.6-molar n-butyllithium solution in 40 ml of tetrahydrofuran at 0° C.) and 11.51 g (100.00 mmol) of 2,6-difluoropyridine are refluxed in 40 ml of tetrahydrofuran for 7 hours. The mixture is then distributed between sodium chloride solution and ether, the ether phase is washed twice with sodium chloride, dried over sodium sulfate, filtered and freed from solvent. Purification of the residue by chromatography (silica gel, 9:1 hexane/ethyl acetate) gives 13.48 g (59.80 mmol) of 2-fluoro-6-octyloxypyridine.

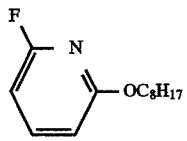

34.62 ml (69.24 mmol) of a 2-molar solution of lithium diisopropylamide in tetrahydrofuran/hexane/ethylbenzene are added dropwise at −78° C. to 13.00 g (57.70 mmol) of 2-fluoro-6-octyloxypyridine in 200 ml of tetrahydrofuran, and the mixture is stirred for 4 hours. 26.05 g (138.48 mmol) of triisopropyl borate are then added dropwise at −78° C., and the reaction mixture is stirred overnight, during which it warms to room temperature. After addition of 80 ml of 10% hydrochloric acid and stirring at room temperature for 1 hour, sodium chloride solution is added, the mixture is extracted with ether, the ether phase is washed with sodium chloride solution, dried over sodium sulfate, filtered and concentrated. Recrystallization from acetonitrile gives 9.03 g (33.55 mmol) of 2-fluoro-6-octyloxypyridine-3-boronic acid.

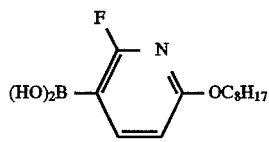

2.00 g (7.44 mmol) of 2-fluoro-6-octyloxypyridine-3-boronic acid, 1.64 g (5.72 mmol) of 1-bromo-4-octyloxybenzene, 0.26 g (0.22 mmol) of tetrakis (triphenylphosphine)palladium(0) and 11.16 ml (22.32 mmol) of 2-molar sodium carbonate solution are refluxed in 20 ml of benzene and 10 ml of ethanol for 6 hours. After distributing the reaction mixture between water and diethyl ether, the organic phase is washed with water, dried over sodium sulfate, filtered and concentrated. Purification of the residue by chromatography (silica gel, 95:5 hexane/ethyl acetate) and recrystallization from acetonitrile give 1.02 g of 2-fluoro-6-octyloxy3-(4-octyloxyphenyl)pyridine.

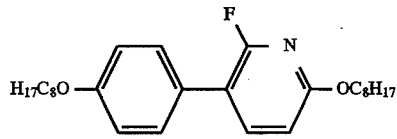

The compound exhibits the phase sequence:
X 39 S$_c$ 40 I

EXAMPLE 6

2-Fluoro-6-[4-(4-octyloxyphenyl)phenyl]pyridine

Preparation by method B:

24.00 g (66.60 mmol) of 4-bromo-4'-octyloxybiphenyl in 500 ml of hexane and 160 ml of benzene are stirred at room temperature with 49 ml (78.70 mmol) of a 1.6-molar n-butyllithium solution in hexane under argon for 18 hours. The reaction mixture is then slowly added dropwise at 0° C. under argon to a solution of 5.5 ml (60 mmol) of 2,6-difluoropyridine in 200 ml of tetrahydrofuran. After a reaction time of 5 hours at 0° C., the reaction mixture is evaporated to dryness, the residue is taken up in toluene, and solid components are filtered off. The filtrate is washed with water, dried over sodium sulfate, filtered and freed from solvent. Recrystallization from 8:2 hexane/ethyl acetate gives 5.77 g of 2-fluoro-6-[4-(4-octyloxyphenyl)phenyl] pyridine.

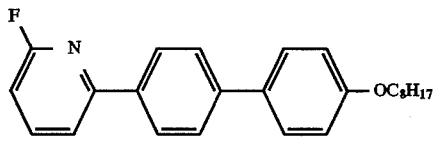

The compound exhibits the phase sequence:

X 148 S$_{149}$ S$_c$ 150 S$_A$ 162 I

EXAMPLE 7

2-Fluoro-3-octyloxy-6-[4-(4-octyloxyphenyl)phenyl] pyridine

Preparation by method B:

7.95 ml (15.90 mmol) of a 2-molar lithium diisopropylamide solution in tetrahydrofuran/hexane/ethylbenzene are added dropwise at −78° C. to 5.00 g (13.25 mmol) of 2-fluoro-6-[4-(4-octyloxyphenyl)phenyl]pyridine (prepared as described in Example 6) in 1000 ml of tetrahydrofuran, and the mixture is stirred for 4 hours. 5.98 (31.80 mmol) of triisopropyl borate in 10 ml of tetrahydrofuran are then added dropwise at −78° C., and the reaction mixture is stirred overnight, during which it warms to room temperature. After addition of 20 ml of 10% hydrochloric acid and stirring at room temperature for 1 hour, sodium chloride solution is added, the mixture is extracted with ether, the ether phase is washed with sodium chloride, dried over sodium sulfate, filtered and concentrated. The residue is taken up in 200 ml of tetrahydrofuran, boiled with 40 ml of 17.5% hydrogen peroxide solution at 80° C. for 2 hours and then distributed between water and ether. The ether phase is washed with sodium sulfite solution and water, dried over sodium sulfate, filtered, evaporated to dryness, and the residue is chromatographed on silica gel using 8:2 toluene/ THF, giving 1.7 g of 2-fluoro-3-hydroxy-6-[4-(4-octyloxyphenyl)phenyl]pyridine.

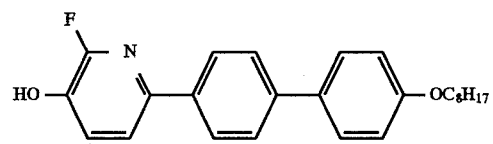

1.02 ml (6.45 mmol) of diethyl azodicarboxylate are added dropwise at 0° C. to 1.70 g (6.45 mmol) of triphenylphosphine in 100 ml of tetrahydrofuran and the mixture is stirred at room temperature for 30 minutes. 1.70 g (4.30 mmol) of 2-fluoro-3-hydroxy-6-[4-(4-octyloxyphenyl) phenyl]pyridine and 0.56 g (4.30 mm 1-octanol are then added. After a reaction time of 18 hours, the precipitated product is filtered off and purified by chromatography (silica gel, dichloromethane) and by recrystallization from acetonitrile, giving 1.13 g of 2-fluoro-3-octyloxy-6-[4-(4-octyloxyphenyl)phenyl]pyridine.

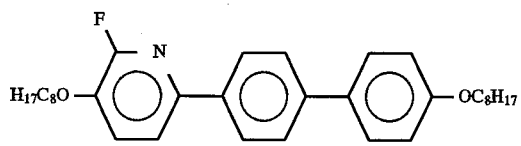

The compound exhibits the following phase sequence:
X 144 $S_x$ 167 $S_c$ 208 I

EXAMPLE 8

2-Fluoro-3-octyloxy-6-[4-(4-octylphenyl)phenyl]pyridine

This compound is prepared analogously to Example 7.

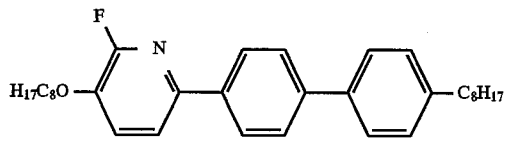

The compound exhibits the following phase sequence:
X 98 $S_3$ 122 $S_2$ 145 $S_c$ 184 I

EXAMPLE 9

2-Fluoro-3-hexyloxy-6-[4-(4-octylphenyl)phenyl]pyridine

This compound is prepared analogously to Example 7.

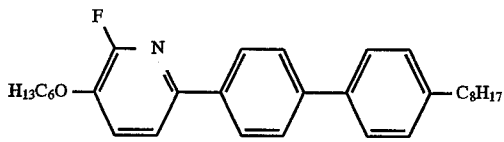

The compound exhibits the phase sequence:
X 80 $S_3$ 142 $S_2$ 155 $S_c$ 189 I

EXAMPLE 10

2-Fluoro-3,6-di(4-octyloxyphenyl)pyridine

Preparation by method B:

8.00 ml (56.80 mmol) of diisopropylamine in 10 ml of tetrahydrofuran are stirred at 0° C. with 35.70 ml (56.80 mmol) of a 1.6-molar n-butyllithium solution in hexane for 1 hour. After cooling to −78° C., 8.56 g (28.40 mmol) of 2-fluoro-6-(4-octyloxyphenyl)pyridine (prepared as described in Example 2) in 1000 ml of tetrahydrofuran are added dropwise, and the mixture is stirred at −78° C. for 4 hours. 21.25 g (113.00 mmol) of triisopropyl borate are then added dropwise at −78° C., and the reaction mixture is stirred overnight, during which it warms to room temperature. After addition of 100 ml of 10% hydrochloric acid and stirring at room temperature for one hour, sodium chloride solution is added, the mixture is extracted with ether, the ether phase is washed with sodium chloride solution, dried over sodium sulfate, filtered and concentrated. Recrystallization from acetonitrile gives 7.70 g of 2-fluoro-6-(4-octyloxyphenyl)pyridine-3-boronic acid.

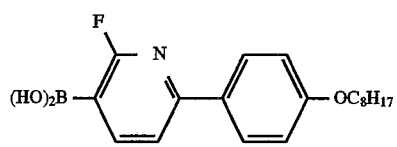

3.35 g (10.00 mmol) of 2-fluoro-6-(4-octyloxyphenyl)pyridine-3-boronic acid in 45 ml of ethanol are refluxed together with 2.85 g (10.00 mmol) of 1-bromo-4-octyloxybenzene and 0.37 g (0.31 mmol) of tetrakis(triphenylphosphine)palladium in 60 ml of benzene and 3.18 g (30.00 mmol) of sodium carbonate in 12 ml of water for 20 hours. After distributing the reaction mixture between water and dichloromethane, the organic phase is washed with sodium chloride solution, dried over sodium sulfate, filtered and concentrated. Purification of the residue by chromatography (silica gel, dichloromethane) and recrystallization from acetonitrile give 2.5 g of 2-fluoro-3,6-di(4-octyloxyphenyl)pyridine.

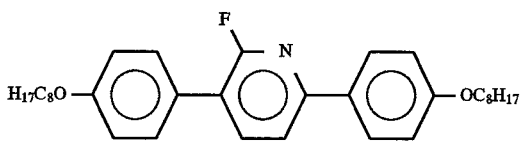

The compound exhibits the following phase sequence:
X 105 $S_c$ 176 N 182 I

This compound differs from the compound of Example 7 in the position of the fluoropyridine group in the ring system. The middle position of the fluoropyridine group is advantageous, since the compound of the above-mentioned example has a melting point which is 38° C. lower compared with that of the compound of Example 4. Furthermore, in addition a nematic phase can be observed, and the $S_c$ phase is almost twice as broad.

EXAMPLE 11

2-Fluoro-3-(4-heptylphenyl)-6-(4-octyloxyphenyl)pyridine

This compound is prepared analogously to Example 10.

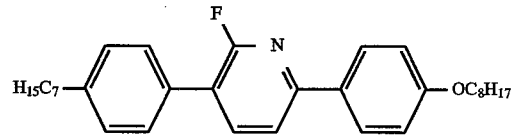

The compound exhibits the phase sequence:
X 58 $S_3$ 57 $S_2$ 65 $S_c$ 157 N 164 I

EXAMPLE 12

2-Fluoro-6-octyloxy-3-[4-(4-octyloxyphenyl)phenyl]pyridine

Preparation by method B:

2.10 g (7.50 mmol) of 2-fluoro-6-octyloxypyridine-3-boronic acid (prepared as described in Example 5) in 35 ml of ethanol are refluxed together with 2.70 g (7.50 mmol) of 4-bromo-4'-octyloxybiphenyl and 0.29 g (0.24 mmol) of tetrakis(triphenylphosphine)palladium in 46 ml of benzene and 2.5 g (23.40 mmol) of sodium carbonate in 11 ml of water for 20 hours. After distributing the reaction mixture between water and dichloromethane, the organic phase is washed with sodium chloride solution, dried over sodium sulfate, filtered and concentrated. Purification of the residue by chromatography (silica gel, dichloromethane) and recrystallization from acetonitrile give 0.50 g of 2-fluoro-6-octyloxy-3-[4-(4-octyloxyphenyl)phenyl]pyridine.

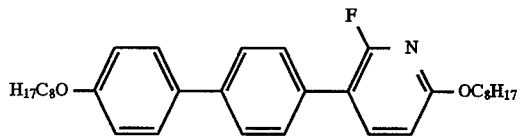

The compound exhibits the following phase sequence:
X 87 $S_x$ 116 $S_c$ 158 $S_A$ 163 I

EXAMPLE 13

2-Fluoro-6-hexyloxy-3-[4-(4-octyloxyphenyl) phenyl]pyridine

This compound is prepared analogously to Example 12.

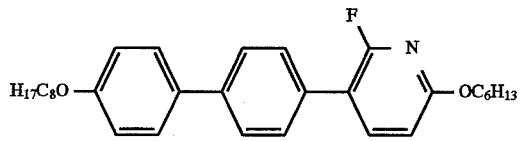

The compound exhibits the phase sequence:
X 85 $S_4$ 93 $S_3$ 119 $S_c$ 161 $S_A$ 169 I

EXAMPLE 14

2-Fluoro-6-octyloxy-3-[4-(4-octylphenyl)phenyl] pyridine

This compound is prepared analogously to Example 12.

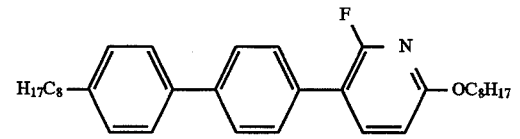

The compound exhibits the phase sequence:
X 62 $S_x$ 96 $S_c$ 116 $S_A$ 133 I

EXAMPLE 15

2-Fluoro-6-hexyloxy-3-[4-(4-octylphenyl)phenyl] pyridine

This compound is prepared analogously to Example 12.

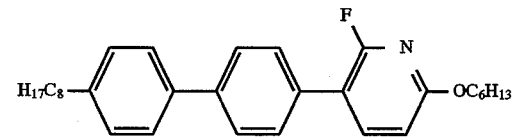

The compound exhibits the phase sequence:
X 44 $S_4$ 92 $S_3$ 99 $S_c$ 118 $S_A$ 138 I The tendency of 2-fluoropyridine compounds to form broad $S_c$ phases is illustrated by Examples 12 to 15.

EXAMPLE 16

1,4-Di(2-fluoro-6-octyloxypyridin-3-yl)benzene

Preparation by method B:

0.87 g (3.7 mmol) of 1,4-dibromobenzene, 2.00 g (7.4 mmol) of 2-fluoro-6-octyloxypyridin-3-boronic acid (prepared as described in Example 5), 0.56 g (0.46 mmol) of tetrakis(triphenylphosphine)palladium(0) and 5 g (46.1 mmol) of sodium carbonate in 50 ml of benzene, 35 ml of ethanol and 20 ml of water are refluxed for 18 hours. After distributing the reaction mixture between water and dichloromethane, the organic phase is washed with sodium chloride solution, dried over sodium sulfate, filtered and concentrated. Purification of the residue by chromatography (silica gel, $CH_2Cl_2$) and recrystallization from acetonitrile give 1.55 g of 1,4-di(2-fluoro-6-octyloxypyridine-3-yl) benzene.

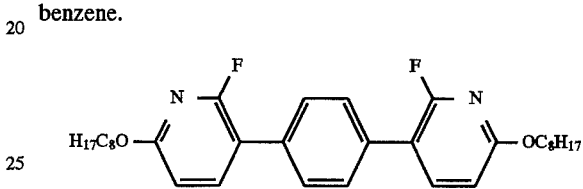

The compound exhibits the phase sequence:
X 91 $S_A$ 95 I

Example 17

2,5-Di(2-fluoro-6-octyloxypyridin-3-yl)pyrimidine

This compound is prepared analogously to Example 16.

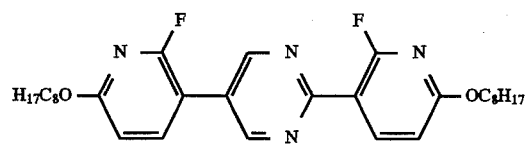

The compound exhibits the phase sequence:
X 91 $S_c$ 110 $S_A$ 116 I

EXAMPLE 18

2,5-Di (2-fluoro-6-octyloxypyridin-3-yl )pyridine

This compound is prepared analogously to Example 16.

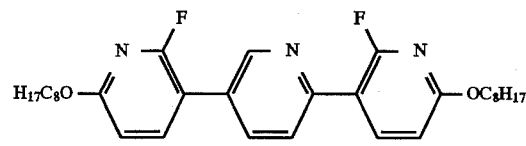

The compound exhibits the phase sequence:
X 65 $S_c$ 85 $S_A$ 104 I

Example 19

3,6-Di (2-fluoro-6-octyloxypyridin-3-yl) pyridazine

This compound is prepared analogously to Example 16.

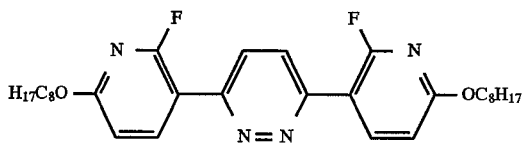

The compound exhibits the phase sequence:
X 100 $S_c$ 127 N 128 I

EXAMPLE 20

2-Fluoro-6-(4-octyloxyphenyl)pyridin-3-yl trans-4-pentylcyclohexanecarboxylate

Preparation by method B:

0.29 g (0.91 mmol) of 2-fluoro-3-hydroxy-6-(4-octyloxyphenyl)pyridine (prepared as described in Example 3), 0.19 g (0.91 mmol) of dicyclohexylcarbodiimide, 0.16 g (0.91 mmol) of trans-4-pentylcyclohexanecarboxylic acid and 0.01 g of 4-(N,N-dimethylamino)pyridine are stirred in 10 ml of methylene chloride at room temperature for 18 hours. Filtration, evaporation to dryness, purification by chromatography (silica gel, 8:2 hexane/ethyl acetate) and recrystallization from acetonitrile give 0.19 g of 2-fluoro-6-(4-octyloxyphenyl)pyridin-3-yl trans-4-pentylcyclohexanecarboxylate.

The compound exhibits the following phase sequence:
X 62 $S_2$ 72 $S_c$ 137 N 184 I This example documents that compounds containing the structural unit according to the invention have excellent liquid-crystalline properties, in particular a broad smectic C phase and a broad nematic phase.

Compared with the pyrimidine compound

Phase sequence: X 76 $S_c$ 115 $S_A$ 190 N 207 I

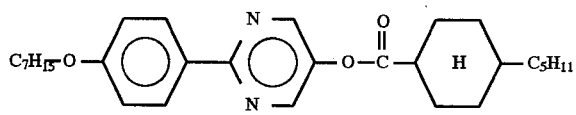

the compound according to the invention has a melting point which is 14° C. lower, a considerably broader nematic phase and a broader $S_c$ phase.

Compared with the fluoropyrimidine compound

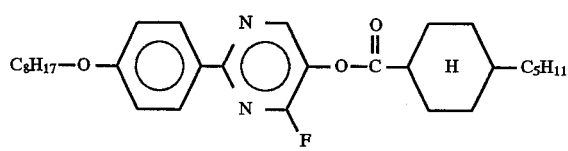

Phase sequence: X 60 $S_c$ 67 N 188 I, the compound according to the invention has a considerably broader smectic C phase.

EXAMPLE 21

4-(2-Fluoro-3-octylpyridin-6-yl)phenyl trans-4-pentylcyclohexanecarboxylate

Preparation by method B:

11.06 g (162.5 mmol) of imidazole in 30 ml of dimethylformamide are added dropwise at room temperature to 35.24 g (130.0 mmol) of tert.-butylchlorodiphenylsilane and 11.25 g (65.0 mmol) of 4-bromophenol in 150 ml of dimethylformamide. After stirring at room temperature for 1 hour, the reaction mixture is poured onto 1000 ml of 5% sodium bicarbonate solution, the resulting mixture is extracted twice with 400 ml of dichloromethane, the organic phase is washed with sodium chloride solution, dried over sodium sulfate, filtered and evaporated to dryness. Purification of the residue by chromatography (silica gel, 8:2 hexane/ethyl acetate) gives 23.40 g of 4-bromophenyl tert.-butyldiphenylsilyl ether.

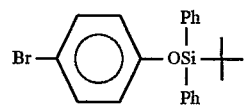

22.61 g (55.0 mmol) of 4-bromophenyl tert.-butyldiphenylsilyl ether in 40 ml of benzene and 35 ml (55.0 mmol) of a 1.6-molar n-butyllithium solution in hexane are stirred overnight at room temperature under argon and then slowly added dropwise to 4.50 ml (50.0 mmol) of 2,6-difluoropyridine in 40 ml of tetrahydrofuran at 0° C. under argon. After a reaction time of 3 hours at 0° C., sodium chloride solution is added, the resulting mixture is taken up in ether, the organic phase is washed with sodium chloride solution, dried over sodium sulfate, filtered, freed from solvent, and the residue is purified by chromatography (silica gel, 9:1 hexane/ethyl acetate), giving 6.80 g of 6-(4-tert.-butyldiphenylsilyloxyphenyl)-2-fluoropyridine.

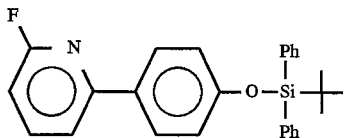

4.46 ml (31.8 mmol) of diisopropylamine in 55 ml of tetrahydrofuran are stirred with 20 ml (31.8 mmol) of a 1.6-molar n-butyllithium solution in hexane at 0° C. for 1 hour. After cooling to −78° C., 6.80 g (15.9 mmol) of 2-fluoro-6-(4-tert.-butyldiphenylsilyloxyphenyl)pyridine in 500 ml of tetrahydrofuran are added dropwise, and the mixture is stirred at −78° C. for 4 hours. 11.9 g (63.25 mmol) of triisopropyl borate in 30 ml of tetrahydrofuran are then added dropwise at −78° C., and the reaction mixture is stirred overnight, during which it warms to room temperature. After addition of 8 ml of 4:1 acetic acid/water and stirring at room temperature overnight, sodium chloride solution is added, the resulting mixture is extracted with ether, the ether phase is washed with sodium chloride solution, dried over sodium sulfate, filtered and concentrated. The residue is taken up in 300 ml of tetrahydrofuran, and the resulting mixture is refluxed together with 50 ml of a 17.5% hydrogen peroxide solution for 4 hours. After addition of sodium chloride solution, extraction with ether, washing of the organic phase with sodium sulfite solution and sodium chloride solution, drying over sodium sulfate, filtration, evaporation to dryness and purification of the residue by chromatography (silica gel, 8:2 hexane/ethyl acetate), 3.58 g of 6-(4-tert.-butyldiphenylsilyloxyphenyl)-2-fluoro-3-hydroxypyridine are obtained.

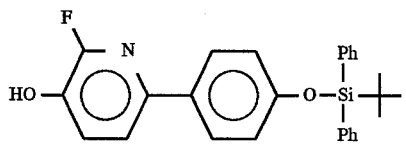

2.30 g (13.35 mmol) of diethyl azodicarboxylate are added dropwise at 0° C. to 3.47 g (13.35 mmol) of triphenylphosphine in 100 ml of tetrahydrofuran, and the mixture is stirred at room temperature for 30 minutes. 3.58 g (8.10 mmol) of 6-(4-tert.-butyldiphenylsilyloxyphenyl)-2-fluoro-3-hydroxypyridine and 1.70 g (13.35 mmol) of 1-octanol are then added. After a reaction time of 1.5 hours at room temperature, the solvent is distilled off, and the residue is purified by chromatography (silica gel, 95:5 hexane/ethyl acetate), giving 4.43 g of 6-(4-tert.-butyldiphenylsilyloxyphenyl)-2-fluoro-3-octyloxypyridine.

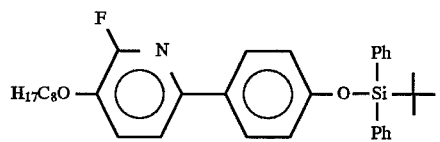

4.30 g (8.00 mmol) of 6-(4-tert.-butyldiphenylsilyloxyphenyl)-2-fluoro-3-octyloxypyridine are stirred in 16 ml of a 1-molar tetrabutylammonium fluoride solution in tetrahydrofuran and 50 ml of tetrahydrofuran at room temperature for 2 hours. Sodium chloride solution is then added, the resulting mixture is extracted with ether, the ether phase is washed with sodium chloride solution, dried over sodium sulfate, evaporated to dryness, and the residue is purified by chromatography (silica gel, 8:2 hexane/ethyl acetate), giving 2.16 g of 2-fluoro-6-(4-hydroxyphenyl)-3-octyloxypyridine.

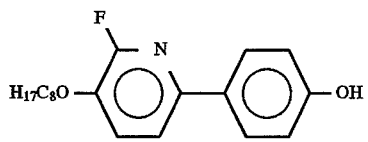

1.11 g (3.50 mmol) of 2-fluoro-6-(4-hydroxyphenyl)-3-octyloxypyridine, 0.72 g (3.50 mmol) of dicyclohexylcarbodiimide, 0.69 g (3.50 mmol) of trans-4-pentylcyclohexanecarboxylic acid and 0.02 g of 4-(N,N-dimethylamino)pyridine are stirred in 20 ml of dichloromethane at room temperature for 3 hours. After filtration of the mixture, evaporation of the filtrate to dryness, purification of the residue by chromatography (silica gel, 8:2 hexane/ethyl acetate) and recrystallization from n-hexane, 1.00 g of 4-(2-fluoro-3-octyloxypyridine-6-yl)phenyl trans-4-pentylcyclohexanecarboxylate is obtained.

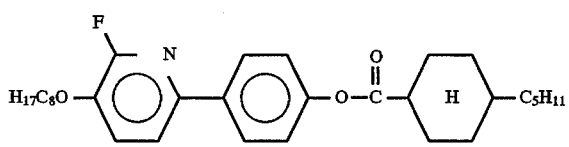

The compound exhibits the following phase sequence:
X 75 S$_x$ 91 S$_c$ 162 N 188 I

EXAMPLE 22

2-Fluoro-6-(4-octyloxyphenyl)-3-(trans-4-pentylcyclohexylmethoxy)pyridine

Preparation by method B:

Analogously to Example 3, 0.87 g of 2-fluoro-6-(4-octyloxyphenyl)-3-(trans-4-pentylcyclohexylmethoxy)pyridine is obtained from 1.85 g (7.05 mol) of triphenylphosphine, 1.23 g (7.05 mol) of diethyl azodicarboxylate, 1.5 g (4.70 mol) of 2-fluoro-3-hydroxy-6-(4-octyloxyphenyl)pyridine (prepared as described in Example 3) and 0.86 g (4.70 mol) of trans-4-pentylcyclohexylmethanol in 30 ml of tetrahydrofuran.

The compound exhibits the phase sequence:

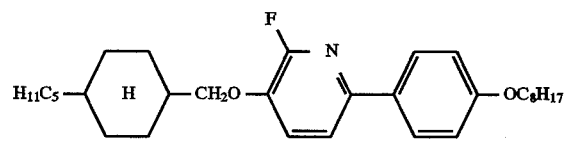

X 79 S$_c$ 150 S$_A$ 155 N 158 I

EXAMPLE 23

2-Fluoro- 3-octyloxy- 6-(trans-4-pentylcyclohexyl)pyridine

Preparation by method B:

12.48 g (40.40 mmol) of 4-(trans-4-pentylcyclohexyl)bromobenzene in 30 ml of benzene are stirred with 25.20 ml (40.40 mmol) of a 1.6-molar n-butyllithium solution in hexane at room temperature under argon for 18 hours. The reaction mixture is then slowly added dropwise at 0° C. under argon to a solution of 4.20 g (36.70 mmol) of 2,6-difluoropyridine in 30 ml of tetrahydrofuran. After a reaction time of one hour at 0° C., the mixture is distributed between ether and sodium chloride solution, the organic phase is washed with sodium chloride solution, dried over sodium sulfate, filtered and freed from solvent. Purification of the residue by chromatography gives 0.94 g of 2-fluoro-6-[4-(trans-4-pentylcyclohexyl)phenyl]pyridine.

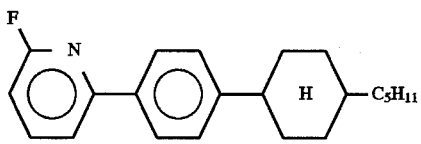

0.49 ml (3.50 mmol) of diisopropylamine in 10 ml of tetrahydrofuran are stirred with 2.20 ml (3.50 mmol) of a 1.6-molar n-butyllithium solution in hexane at 0° C. for one hour. After cooling to −78° C., 0.94 g (2.90 mmol) of 2-fluoro-6-[4-(trans-4-pentylcyclohexyl)phenyl]pyridine in 120 ml of tetrahydrofuran is added dropwise, and the mixture is stirred at −78° C. for 4 hours. 1.31 g (6.96 mmol) of triisopropyl borate are then added dropwise at −78° C., and the reaction mixture is stirred overnight, during which it warms to room temperature. Addition of 4.40 ml of 10% hydrochloric acid and one hour of stirring at room temperature is followed by addition of sodium chloride solution, extraction with ether, washing of the ether phase with sodium chloride solution, drying over sodium sulfate, filtration and concentration. The residue is taken up in 50 ml of tetrahydrofuran, and the resulting mixture is refluxed together with 8.80 ml of a 17.5% hydrogen peroxide solution for 4 hours. After addition of sodium chloride solution, extraction with ether, washing of the organic phase with sodium sulfite solution and sodium chloride solution, drying over sodium sulfate, filtration, evaporation to dryness and purification of the residue by chromatography (silica gel, 9:1 hexane/ethyl acetate), 0.31 g of 2-fluoro-3-hydroxy-6-[4-(trans-4-pentylcyclohexyl)phenyl]pyridine is obtained.

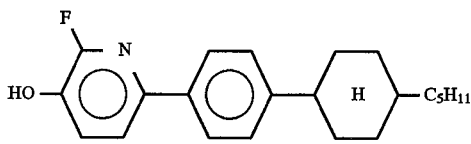

0.26 g (1.50 mmol) of diethyl azodicarboxylate is added dropwise at 0° C. to 0.39 g (1.50 mmol) of triphenylphosphine in 10 ml of tetrahydrofuran, and the mixture is stirred at room temperature for 30 minutes. 0.31 g (0.91 mmol) of 2-fluoro-3-hydroxy-6-[4-(trans-4-pentylcyclohexyl)phenyl] pyridine and 0.19 g (1.50 mmol) of 1-octanol are then added. After a reaction time of 2hours at room temperature, the solvent is distilled off, and the residue is purified by chromatography (silica gel, 9:1 hexane/ethyl acetate) and by recrystallization from acetonitrile, giving 0.20 g of 2-fluoro-3-octyloxy-6-[4-(trans-4-pentylcyclohexyl)phenyl]pyridine.

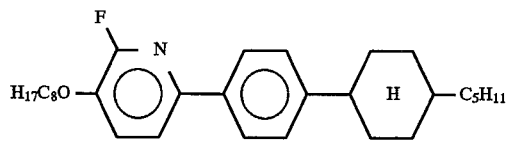

The compound exhibits the following phase sequence:

X 77 $S_c$ 137 $S_A$ 150 N 161 I

Compounds of this type are particularly advantageous since, apart from having a low melting point, they exhibit all phases necessary for ferroelectric mixtures.

EXAMPLE 24

2-Fluoro-3-hexyloxy-6-[4-(trans-4-pentylcyclohexyl)phenyl]pyridine

This compound is prepared analogously to EXAMPLE 23.

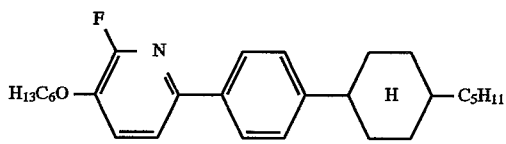

The compound exhibits the phase sequence:

X 80 $S_3$ 84 $S_c$ 137 $S_A$ 148 N 168 I

EXAMPLE 25

3-Decyloxy-2-fluoro-6-[4-(trans-4-pentylcyclohexyl) phenyl]pyridine.

This compound is prepared analogously to EXAMPLE 23.

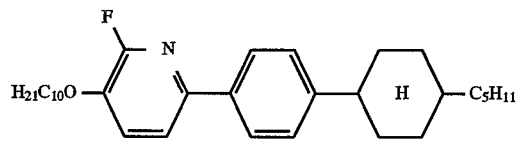

The compound exhibits the phase sequence:
X 76 $S_c$ 133 $S_A$ 151 N 156 I

EXAMPLE 26

3-Dodecyloxy-2-fluoro-6-[4-(trans-4-pentylcyclohexyl)phenyl]pyridine

This compound is prepared analogously to EXAMPLE 23.

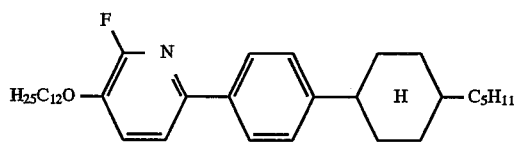

The compound exhibits the phase sequence:
X 80 $S_c$ 127 $S_A$ 148 N 150 I

EXAMPLE 27

3-[4-(Butyldimethylsilyl)butyloxy]-2-fluoro-6-[4-(trans-4-pentylcyclohexyl)phenyl]pyridine This compound is prepared analogously to EXAMPLE 23.

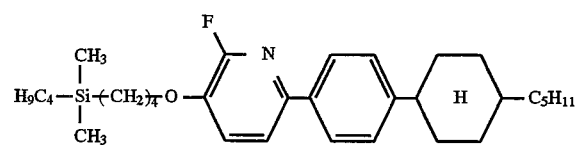

The compound exhibits the phase sequence:
X 61 $S_c$ 91 $S_A$ 102 I

EXAMPLE 28

2-Fluoro-6-octyloxy-3-[4-(trans-4-pentylcyclohexyl)phenyl]pyridine

Preparation by method B:

Analogously to EXAMPLE 5, 2.0 g of 2-fluoro-6-octyloxy-3-[4-(trans-4-pentylcyclohexyl)phenyl]pyridine are obtained from 2.27 g (7.4 mmol) of 1-bromo-4-(trans-4-pentylcyclohexyl)benzene, 2.00 g (7.4 mmol) of 2-fluoro-6-octyloxypyridine-3-boronic acid, 0.28 g (0.23 mmol) of tetrakis(triphenylphosphine)palladium(0) and 2.5 g (23.1 mmol) of sodium carbonate in 50 ml of benzene, 35 ml of ethanol and 10 ml of water.

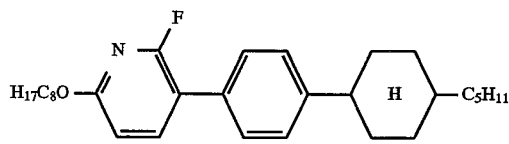

The compound exhibits the phase sequence:
X 78 $S_A$ 110 N 117 I

EXAMPLE 29

6-Decyloxy-2-fluoro-3-[4-(trans-4-pentylcyclohexyl)phenyl]pyridine

This compound is prepared analogously to EXAMPLE 28.

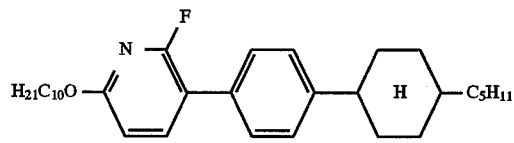

The compound exhibits the phase sequence:
X 64 $S_A$ 108 N 112 I

EXAMPLE 30

6-Dodecyloxy-2-fluoro-3-[4-(trans-4-pentylcyclohexyl)phenyl]pyridine

This compound is prepared analogously to EXAMPLE 28.

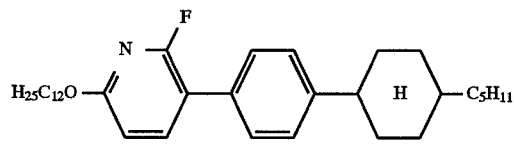

The compound exhibits the phase sequence:
X 62 $S_A$ 104 N 107 I

EXAMPLE 31

2-Fluoro-3-[4-(4-octylphenyl)phenyl]-6-(4-octyloxyphenyl)pyridine

This compound is prepared analogously to EXAMPLE 10.

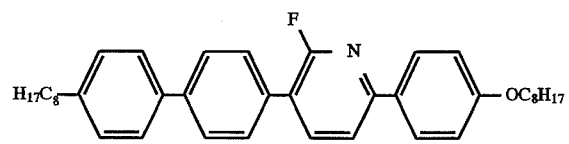

The compound exhibits the phase sequence:
X 73 $S_x$ 173 $S_c$ 273 $S_A$ 275 N 281 I

EXAMPLE 32

2-Fluoro-3-(5-octyl-1,3-dioxaborinan-2-yl)-6-(4-octyloxyphenyl)pyridine

Preparation by method B:

1.00 g (3.00 mmol) of 2-fluoro-6-(4-octyloxyphenyl)pyridine-3-boronic acid (prepared as described in Example 10), 0.56 g (3.00 mmol) of 2-octylpropane-1,3-diol and 1.50 g of sodium sulfate in 30 ml of tetrahydrofuran are stirred at room temperature for 48 hours. Sodium sulfate is then filtered off, the filtrate is concentrated, and the residue is recrystallized from hexane, giving 1.24 g of 2-fluoro-3-(5-octyl-1,3-dioxaborinan-2-yl)-6-(4-octyloxyphenyl)pyridine.

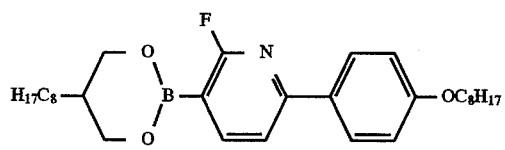

The compound exhibits the phase sequence:
X 91 $S_c$ 127 N 142 I

EXAMPLE 33

2-Fluoro-3-(5-octyl-1,3-dioxan-2-yl)-6-(4-octyloxyphenyl)pyridine

Preparation by method B:

2.55 ml (18.2mmol) of diisopropylamine in 30 ml of tetrahydrofuran are stirred at 0° C. with 11.4 ml (18.2mmol) of a 1.6-molar n-butyllithium solution in hexane for one hour. After addition of 170 ml of tetrahydrofuran and cooling to −78° C., 3.64 g (12.1 mmol) of 2-fluoro-6-(4-octyloxyphenyl)pyridine (prepared as described in EXAMPLE 2) in 90 ml of tetrahydrofuran are added dropwise, and the mixture is stirred at −78° C. for 4 hours. 1.86 ml (24.2mmol) of N,N-dimethylformamide are then added dropwise at −78° C., and the reaction mixture is stirred overnight, during which it warms to room temperature. For workup, the mixture is poured onto sodium chloride solution, the resulting mixture is extracted with ether, the organic phase is washed with water, dried over sodium sulfate, filtered and concentrated. Purification of the residue by chromatography (silica gel, $CH_2Cl_2$) gives 2.20 g of 2-fluoro-3-formyl-6-(4-octyloxyphenyl)pyridine.

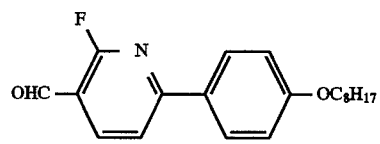

2.20 g (6.68 mmol) of 2-fluoro-3-formyl-6-(4-octyloxyphenyl)pyridine, 1.26 g (6.68 mmol) of 2-octylpropane-1,3-diol, 0.02g (0.10mmol) of p-toluenesulfonic acid and 3.00 g of sodium sulfate are stirred in 100 ml of toluene at room temperature for 68 hours. 0.14 ml (1.00 mmol) of triethylamine is then added, sodium sulfate is filtered off, the filtrate is concentrated, and the residue is purified by chromatography (silica gel, 9:1 hexane/ethyl acetate) and by recrystallization from acetonitrile, giving 1.40 g of 2-fluoro-3-(5-octyl-1,3-dioxane-2-yl)-6-(4-octyloxyphenyl)pyridine.

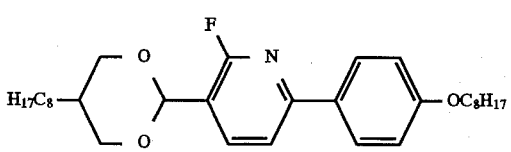

The compound exhibits the phase sequence:
X 86 $S_c$ 103 N 146 I

EXAMPLE 34

2-Fluoro-6-octyloxy-3-(6-octyloxynaphth-2-yl)pyridine

Preparation by method B:

Analogously to EXAMPLE 5, 2.00 g of 2-fluoro-6-octyloxy-3-(6-octyloxynaphth-2-yl)pyridine are obtained from 2.48 g (7.4 mmol) of 2-fluoro-6-octyloxypyridine-3-boronic acid, 0.28 g (0.23mmol) of tetrakis(triphenylphosphine)palladium(0) and 2.5 g (23.1 mmol) of sodium carbonate in 50 ml of benzene, 35 ml of ethanol and 10 ml of water.

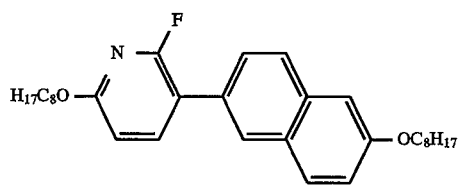

The compound exhibits the phase sequence:

X 58 S$_A$ 86 I

EXAMPLE 35

2-Fluoro-3-octyloxy-6-(6-octyloxynaphth-2-yl)pyridine

Preparation by method B:

The solution of a Grignard compound is prepared from 2.4 g (99.0 mmol) of magnesium and 30 g (89.6 mmol) of 2-bromo-6-octyloxynaphthalene in 250 ml of tetrahydrofuran at 55° C. over a period of 3hours and then added dropwise to a solution of 41.36 ml (179.2 mmol) of triisopropyl borate in 100 ml of tetrahydrofuran cooled to −78° C., and the mixture is stirred overnight. 130 ml of 10% hydrochloric acid are then added dropwise, and the resulting mixture is stirred at room temperature for 1 hour and then distributed between sodium chloride solution and ether, the organic phase is washed with sodium chloride solution, dried over sodium sulfate, concentrated, and the residue recrystallized from hexane, giving 14.5 g of 6-octyloxynaphthalene-2-boronic acid.

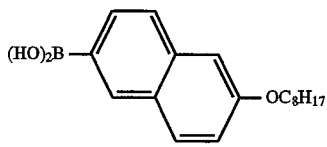

100 g (422.10 mmol) of 2,6-dibromopyridine, 36.79 g (633.15 mmol) of potassium fluoride and 11.16 g of 18-crown-6 are heated in a distillation apparatus 190° C. under vacuum (200 mbar), and the reaction product is distilled off. Repeated purification by distillation gives 43.90 g of 2-bromo-6-fluoropyridine having a boiling point of 70° C. at 15 mbar.

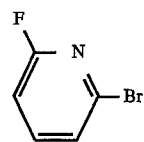

8.51 g (50 mmol) of 2-bromo-6-fluoropyridine, 14.5 g (50 mmol) of 6-octyloxynaphthalene-2-boronic acid, 1.73 g (1.5 mmol) of tetrakis(triphenylphosphine)palladium(0) and 10.6 g (100 mmol) of sodium carbonate are refluxed in 375 ml of benzene, 250 ml of ethanol and 125 ml of water for 3 hours. The mixture is then distributed between sodium chloride solution and ether, the organic phase is washed with sodium chloride solution, dried over sodium sulfate, concentrated, and the residue is purified by chromatography (silica gel, 9:1 hexane/ethyl acetate), giving 12.08 g of 2-fluoro-6-(6-octyloxynaphth-2-yl)pyridine.

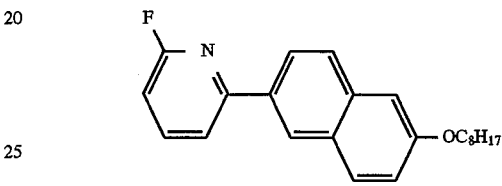

1.08 g (10.68 mmol) of diisopropylamine in 20 ml of tetrahydrofuran are stirred at 0° C. with 6.7 ml (10.68 mmol) of a 1.6-molar n-butyllithium solution in hexane for 1 hour. After cooling to −78° C., 2.50 g (7.12mmol) of 2-fluoro-6-(6-octyloxynaphth-2-yl)pyridine in 250 ml of tetrahydrofuran are added dropwise, and the mixture is stirred at −78° C. for 4 hours. 3.3 ml (14.24 mmol) of triisopropyl borate are then added dropwise at −78° C., and the reaction mixture is stirred overnight, during which it warms to room temperature. Addition of 50 ml of concentrated ammonium chloride solution and 1 hour of stirring at room temperature is followed by addition of sodium chloride solution, extraction with ether, washing of the ether phase with sodium chloride solution, drying over sodium sulfate, filtration and concentration. The residue is taken up in 70 ml of tetrahydrofuran, and the resulting mixture is refluxed with 25 ml of a 17.5% hydrogen peroxide solution for 2hours. After addition of sodium chloride solution, extraction with ether, washing of the organic phase with sodium sulfite solution and sodium chloride solution, drying over sodium sulfate, filtration, evaporation to dryness and purification of the residue by chromatography (silica gel, 7:3hexane/ethyl acetate), 1.55 g of 2-fluoro-3-hydroxy-6-(6-octyloxynaphth-2-yl)pyridine are obtained.

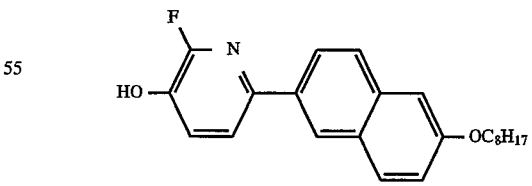

1.06 g (6.11 mmol) of diethyl azodicarboxylate are added dropwise at 0° C. to 1.60 g (6.11 mmol) of triphenylphosphine in 50 ml of tetrahydrofuran, and the mixture is stirred at room temperature for 0.5 hour. 1.50 g (4.08 mmol) of 2-fluoro-3-hydroxy-6-(6-octyloxynaphth-2-yl)pyridine and 0.80 g (6.11 mmol) of 1-octanol are then added. After a reaction time of 1 hour at room temperature, the solvent is distilled off, and the residue is purified by chromatography (silica gel, 9:1 hexane/ethyl acetate) and by recrystallization from acetonitrile, giving 1.74 g of 2-fluoro-3-octyloxy-6-(6-octyloxynaphth-2-yl)pyridine.

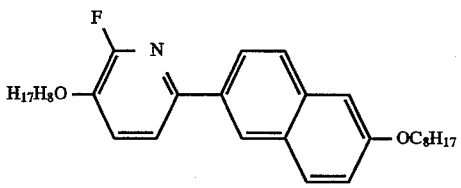

The compound exhibits the phase sequence:
X 105 $S_2$ 95 $S_c$ 136 I

EXAMPLE 36

(2S,3S)-3-Pentyloxiran-2-ylmethyl 2-fluoro-6-(4-octyloxyphenyl)pyridin-3-yl ether Preparation by method B:

0.44 g (2.55 mmol) of diethyl azodicarboxylate is added dropwise at 0° C. to 0.67 g (2.55 mmol) of triphenylphosphine in 15 ml of tetrahydrofuran, and the mixture is stirred at room temperature for 30 minutes. 0.54 g (1.70 mmol) of 2-fluoro-3-hydroxy-6-(4-octyloxyphenyl)pyridine (prepared by EXAMPLE 3) and 0.25 g (1.70 mmol) of (2S,3S)-3-pentyl-2-oxiranylmethanol are then added. After a reaction time of 18 hours at room temperature, the solvent is distilled off, and the residue is purified by chromatography ( silica gel, 8:2hexane/ethyl acetate ). Recrystallization from 8:2hexane/ethyl acetate gives 0.28 g of (2S,3S)-3-pentyloxiran-2-ylmethyl 2-fluoro-6-(4-octyloxyphenyl) pyridin-3-yl ether having an $[\alpha]_D^{20}$(2.4% in $CH_2Cl_2$) of −15.75°.

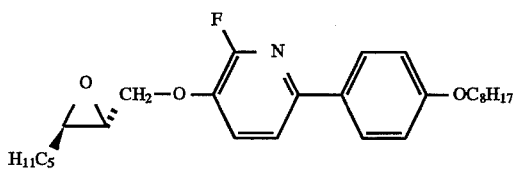

The compound exhibits the following phase sequence:
X 86 $S_c$ 99 I

EXAMPLE 37

(2S,3S)-3-Pentyloxiran-2-ylmethyl 4-(2-fluoro-3-octyloxypyridin-6-yl)phenyl ether Preparation by method B:

0.91 g (5.25 mmol) of diethyl azodicarboxylate is added dropwise at 0° C. to 1.37 g (5.25 mmol) of triphenylphosphine in 20 ml of tetrahydrofuran, and the mixture is stirred at 0° C. for 30 minutes. 1.11 g (3.50 mmol) of 2-fluoro-6-(4-hydroxyphenyl)-3-octyloxypyridine (prepared as described in EXAMPLE 21) and 0.75 g (5.25 mmol) of (2S,3S)-3-pentyl-2-oxiranylmethanol are then added. After a reaction time of 18 hours at room temperature, the solvent is distilled off, and the residue is purified by chromatography (silica gel, 8:2 hexane/ethyl acetate). Recrystallization from hexane gives 0.85 g of (2S,3S)-3-pentyloxiran-2-ylmethyl 4-(2-fluoro-3-octyloxypyridin-6-yl)phenyl ether having an $[\alpha]_D^{20}$ (2.6% in $CH_2Cl_2$) of −18.01°.

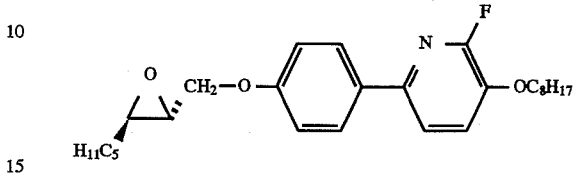

The compound exhibits the phase sequence:
X 93 $S_c$ 113 I

EXAMPLE 38

(2S,3S)-3-Pentyloxiran-2-ylmethyl 2-fluoro-6-(4-(trans-4-pentylcyclohexyl)phenyl)pyridin-3-yl ether This compound is prepared analogously to EXAMPLE 37:

$[\alpha]_D^{20}$ (2.3% in $CH_2Cl_2$)=−12.15°.

The compound exhibits the phase sequence:
X 103 $S_c$ 132 $S_A$ 151 N 163 I

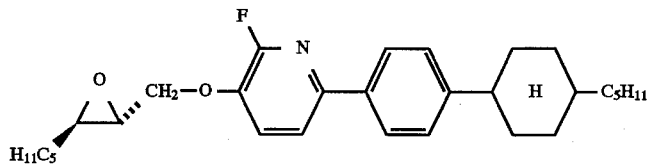

Use Example 1 a) A ferroelectric mixture comprising the components

| | |
|---|---|
| 5-octyloxy-2-(4-hexyloxyphenyl)pyrimidine | 22.8 mol % |
| 5-octyloxy-2-(4-butyloxyphenyl)pyrimidine | 24.0 mol % |
| 5-octyloxy-2-(4-decyloxyphenyl)pyrimidine | 19.2 mol % |
| 5-octyloxy-2-(4-octyloxyphenyl)pyrimidine | 10.5 mol % |
| 4'-(5-decylpyrimidin-2-yl)phenyl trans-4-pentylcyclohexanecarboxylate | 13.5 mol % |
| (2S,3S)-3-pentyloxiran-2-ylmethyl 2-fluoro-6-(4-octyloxyphenyl)pyridin-3-yl ether | 10.0 mol % | exhibits the following liquid-crystalline phase ranges:
S*$_c$ 87 N 101 I

It has a spontaneous polarization of 9.5 nC/cm² at a temperature of 20° C. and a switching time of 350 μs at a field strength of 10 V/μm.

b) Compared with the above mixture, a known liquid-crystalline mixture (DE 3,831,226.3), which differs from the abovementioned mixture only by not containing a doping substance, exhibits the following phase ranges.

X 9 $S_c$ 84 $S_A$ 93 N 105 I

This mixture documents that the compounds according to the invention provide rapidly switching ferroelectric mixtures.

Use Example 2
a) A mixture comprising the components

| | |
|---|---|
| 5-octyloxy-2-(4-hexyloxyphenyl)pyrimidine | 16.4 mol % |
| 5-octyloxy-2-(4-decyloxyphenyl)pyrimidine | 10.9 mol % |
| 5-decyl-2-(4-hexyloxyphenyl)pyrimidine | 10.6 mol % |
| 5-octyl-2-(4'-(7"-cyclopropylheptyloxy)-carbonyloxyphenyl)pyrimidine | 11.0 mol % |
| 5-(8'''-cyclopropyloctyloxy)-2-(4"-trans-pentylcyclohexyl-4'-phenyl)-pyrimidine | 12.7 mol % |
| 4'-(8"-cyclopropyloctyl)pyrimidin-2-ylphenyl trans-4-pentylcyclohexane-carboxylate | 7.8 mol % |
| 5-(5"-cyclopropylpentyloxy)-2-(4'-hexyl-oxyphenyl)pyrimidine | 11.7 mol % |
| (2S,3S)-3-pentyloxiran-2-ylmethyl 4-(2-fluoro-3-octyloxypyridin-6-yl)-phenyl ether | 10 mol % | exhibits the following liquid-crystalline phase ranges:

$S^*_c$ 70 N* 84 I

It has a spontaneous polarization of 2.7 nC/cm² at a temperature of 25° C.

b) Compared with the above mixture, the liquid-crystalline mixture, which differs from the abovementioned mixture only by not containing a doping substance, exhibits the following phase ranges.

X –13 $S_c$ 65 $S_A$ 70 N 86 I

Use Examples 1 and 2 furthermore document that addition of the compounds according to the invention leads to a broadening of the $S_c$ phase range.

Use Example 3

A mixture comprises 30 mol % of 2-fluoro-6-(4-octyloxyphenyl)pyridine-3-yl trans-4-pentylcyclohexanecarboxylate Component A 70 mol % of 4-ethyl-2'-fluoro-4'-[2-(trans-4-n-pentylcyclohexyl)ethyl]biphenyl Component B and has a clearing point of 131° C. and crystallizes at –23° C.

Compared with the above mixture, component B exhibits the following phase transitions:

X 24 $S_B$ (13) N 103.4 I

Addition of the component according to the invention leads to a lowering of the crystallization point and to a broadening of the nematic phase range. This example documents that the components according to the invention are particularly suitable for broadening the nematic range of liquid crystals. It may also be pointed out that the compound in this example lowers the dielectric anisotropy of the mixture.

What is claimed is:

1. A fluoropyridine compound of the formula I

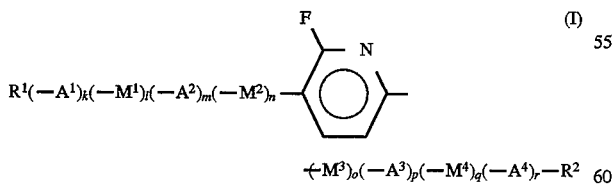

in which the symbols have the following meaning:

R¹, R², independently of one another, are H, or straight-chain or branched (with or without the inclusion of an asymmetric carbon atom) alkyl having 1 to 16 carbon atoms, it also being possible for one or two non-adjacent —CH₂— groups to be replaced by —O—, —S—, —CO—, —CO—O—, —O—CO—, —O—CO—O—, —CH=CH—, —C≡C—, Δ or —Si(CH₃)₂—, and it also being possible for one or more hydrogen atoms of the alkyl radical to be substituted by F, Cl, Br or CN, or are one of the following chiral groups:

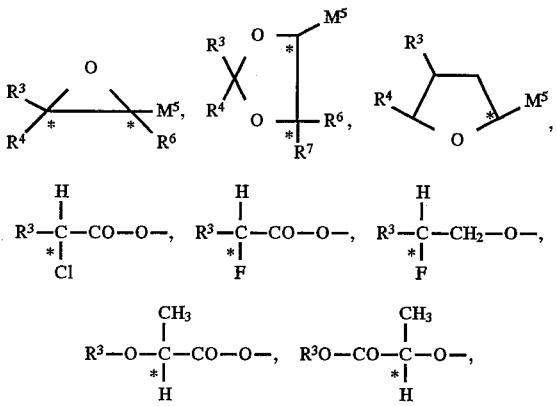

A¹, A², A³, A⁴, identical or different, are 1,4-phenylene, pyridazine-3,6-diyl, pyridine-2,5-diyl, pyrimidine-2,5-diyl, it being possible for one or two hydrogen atoms to be replaced by F, trans-1,4-cyclohexylene, in which one or two hydrogen atoms can be replaced by CN, 1,3,4-thiadiazole-2,5-diyl, 1,3-dioxane-2,5-diyl, naphthalene-2,6-diyl, or 1,3-dioxaborinane-2,5-diyl;

M¹, M², M³, M⁴, identical or different, are —CO—O—, —O—CO—, —CH₂—O—, —O—CH₂—, —CH₂—CH₂—, or —C≡C—;

R³, R⁴, R⁶, R⁷, independently of one another, are H or straight-chain or branched alkyl having 1 to 16 carbon atoms or R³ and R⁴ together are also —(CH₂)₄—, or —(CH₂)₅— if bound as substituents to a dioxolane system, M⁵ is —CH₂—O—, —CO—O—, —O—CH₂—, —O—CO—, k, l, m, n, o, p, q, r are zero or one, with the proviso that the sum of k+m+p+r is less than 4 and greater than zero, and with the proviso that either a) R¹ or R² is H or a straight-chain or branched alkyl (with or without the inclusion of an asymmetric carbon atom) having 1 to 16 carbon atoms, in which one or two non-adjacent CH₂-groups are replaced by —C≡C—, Δ or Si(CH₃)₂, or one of the following chiral groups:

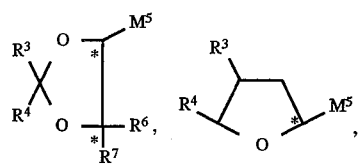

b) or at least one of A¹, A², A³, A⁴ is 1,3,4-thiadiazole-2,5-diyl or 1,3-dioxaborinane-2,5-diyl.

2. A fluoropyridine compound as claimed in claim 1, wherein the symbols of the compounds of the formula I have the following meaning:

R¹, R², independently of one another, are H, or straight-chain or branched (with or without the inclusion of an asymmetric carbon atom) alkyl having 1 to 16 carbon atoms, it also being possible for one —CH$_2$— group to be replaced by —O—, —CO—, —CO—O—, —O—CO—, —O—CO—O—, —CH=CH—, —C≡C—, Δ or —Si(CH$_3$)$_2$—, or are one of the following chiral groups:

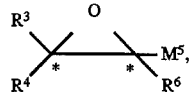

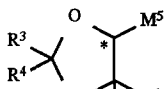

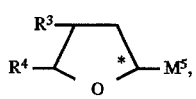

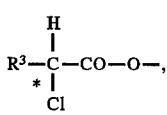

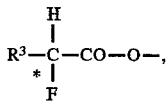

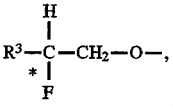

A$^1$, A$^2$, A$^3$, A$^4$, identical or different, are 1,4-phenylene, pyridazine-3,6-diyl, pyridine-2,5-diyl, pyrimidine-2,5-diyl, it being possible for one or two hydrogen atoms to be replaced by F, trans-1,4-cyclohexylene, 1,3,4-thiadiazole-2,5-diyl, 1,3-dioxane-2,5-diyl, naphthalene-2,6-diyl, octane-1,4-diyl] or 1,3-dioxaborinane-2,5-diyl;

M$^1$, M$^2$, M$^3$, M$^4$, identical or different, are —CO—O—, —O—CO—, —CH$_2$—O—, —O—CH$_2$—, —CH$_2$—CH$_2$—, or —C≡C—;

R$^3$, R$^4$, R$^6$, R$^7$, independently of one another, are H or straight-chain or branched alkyl having 1 to 10 carbon atoms or R$^3$ and R$^4$ together are also —(CH$_2$)$_4$—, or —(CH$_2$)$_5$— if bound as substituents to a dioxolane system;

M$^5$ is —CH$_2$—O—, —CO—O—, —O—CH$_2$—, —O—CO—.

3. A fluoropyridine compound as claimed in claim 1, wherein the symbols of the compound of the formula I have the following meaning:

R$^1$, R$^2$, independently of one another, are H, or straight-chain or branched (with or without the inclusion of an asymmetric carbon atom) alkyl having 1 to 16 carbon atoms, it also being possible for one —CH$_2$— group to be replaced by —O—, —CO—, —CO—O—, —O—CO—, —CH=CH—, Δ or —Si(CH$_3$)$_2$—, or are one of the following chiral groups:

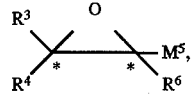

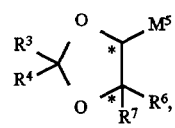

R$^3$—C(H)(Cl)—CO—O—,
*

R$^3$—C(H)(F)—CO—O—,
*

A$^1$, A$^2$, A$^3$, A$^4$, identical or different, are 1,4-phenylene, pyridazine-3,6-diyl, pyridine-2,5-diyl, pyrimidine-2,5-diyl, in which one or two hydrogen atoms can be replaced by F, trans-1,4-cyclohexylene, 1,3-dioxane-2,5-diyl, naphthalene-2,6-diyl or 1,3-dioxaborinane-2,5-diyl;

M$^1$, M$^2$, M$^3$, M$^4$, identical or different, are —CO—O—, —O—CO—, —O—CH$_2$—, —CH$_2$—CH$_2$—;

R$^3$, R$^4$, R$^6$, R$^7$, independently of one another, are H or straight-chain or branched alkyl having 1 to 10 carbon atoms or R$^3$ and R$^4$ together are also —(CH$_2$)$_4$—, or —(CH$_2$)$_5$— if bound as substituents to a dioxolane system;

M$^5$ is —CH$_2$—O—, —CO—O—, —O—CH$_2$—, —O—CO—.

4. A fluoropyridine compound as claimed in claim 1, wherein the symbols of the compound of the formula I have the following meaning:

R$^1$, R$^2$, independently of one another, are H or alkyl having 1 to 16 carbon atoms, it also being possible for one —CH$_2$— group to be replaced by —O—, —CO—O—, —O—CO— or Δ, or are the chiral group

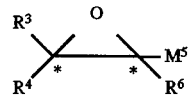

A$^1$, A$^2$, A$^3$, A$^4$, identical or different, are 1,4-phenylene, pyridazine-3,6-diyl, pyridine-2,5-diyl, pyrimidine-2,5-diyl, in which one or two hydrogen atoms can be replaced by F, trans-1,4-cyclohexylene, 1,3-dioxane-2,5-diyl, naphthalene-2,6-diyl or 1,3-dioxaborinane-2,5-diyl;

M$^1$, M$^2$, M$^3$, M$^4$, identical or different, are —CO—O—, —O—CO—, —OCH$_2$— or —CH$_2$—O—;

R$^3$, R$^4$, R$^6$, independently of one another, are H or a straight-chain alkyl having 1 to 10 carbon atoms;

M$^5$ is —CH$_2$—O— or —CO—O—.

5. A ferroelectric liquid crystal mixture, which comprises at least two components, which liquid crystal mixture contains, as one component, a compound of the formula I

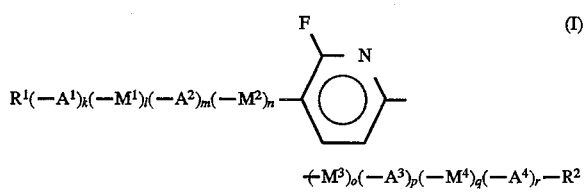 (I)

in which the symbols have the following meaning:

R¹, R², independently of one another, are H, or straight-chain or branched (with or without the inclusion of an asymmetric carbon atom) alkyl having 1 to 16 carbon atoms, it also being possible for one or two non-adjacent —CH₂— groups to be replaced by —O—, —CO—, —CO—O—, —O—CO—, —O—CO—O—, —CH=CH—, —C≡C—, Δ or —Si(CH₃)₂—, and it also being possible for one or more hydrogen atoms of the alkyl radical to be substituted by F, or are one of the following chiral groups:

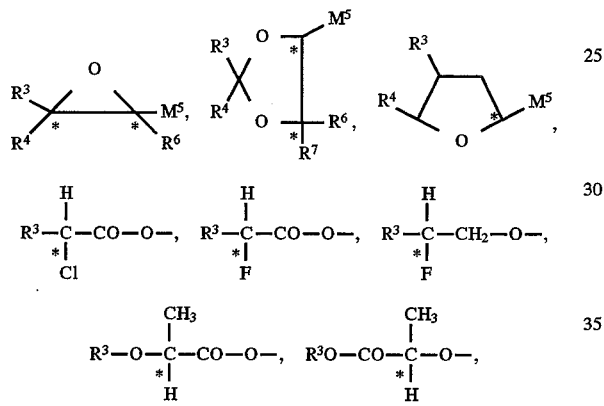

A¹, A², A³, A⁴, identical or different, are 1,4-phenylene, pyridazine-3,6-diyl, pyridine-2,5-diyl, pyrimidine-2,5-diyl, it being possible for one or two hydrogen atoms to be replaced by F, trans-1,4-cyclohexylene, in which one or two hydrogen atoms can be replaced by CN, 1,3,4-thiadiazole-2,5-diyl, 1,3-dioxane-2,5-diyl, naphthalene-2,6-diyl, or 1,3-dioxaborinane-2,5-diyl;

M¹, M², M³, M⁴, identical or different, are —CO—O—, —O—CO—, —CH₂—O—, —O—CH₂—, —CH₂—CH₂—, or —C≡C—;

R³, R⁴, R⁶, R⁷, independently of one another, are H or straight-chain or branched alkyl having 1 to 16 carbon atoms or R³ and R⁴ together are also —(CH₂)₄—, or —(CH₂)₅— if bound as substituents to a dioxolane system, M⁵ is —CH₂—O—, —CO—O—, —O—CH₂—, —O—CO—, k, l, m, n, o, p, q, r are zero or one, with the proviso that the sum of k+m+p+r is less than 4 and greater than zero, and with the proviso that either a) R¹ or R² is H or a straight-chain or branched alkyl (with or without the inclusion of an asymmetric carbon atom) having 1 to 16 carbon atoms, in which one or two non-adjacent CH₂-groups are replaced by —C≡C—, Δ or Si(CH₃)₂, or one of the following chiral groups:

b) or at least one of A¹, A², A³, A⁴ is 1,3,4-thiadiazole-2,5-diyl or 1,3-dioxaborinane-2,5-diyl.

6. A liquid crystal mixture as claimed in claim 5, wherein the symbols of the compounds of the formula I have the following meaning:

R¹, R², independently of one another, are H, or straight-chain or branched (with or without the inclusion of an asymmetric carbon atom) alkyl having 1 to 16 carbon atoms, it also being possible for one —CH₂— group to be replaced by —O—, —CO—, —CO—O—, —O—CO—, —O—CO—O—, —CH=CH—, —C≡C—, Δ or —Si(CH₃)₂—, or are one of the following chiral groups:

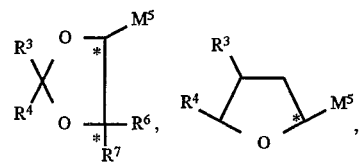

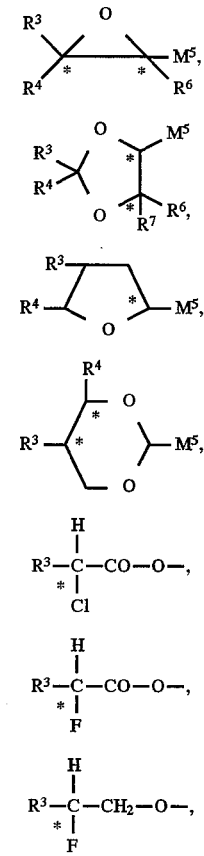

A¹, A², A³, A⁴, identical or different, are 1,4-phenylene, pyridazine-3,6-diyl, pyridine-2,5-diyl, pyrimidine-2,5-diyl, it being possible for one or two hydrogen atoms to be replaced by F, trans-1,4-cyclohexylene, 1,3,4-thiadiazole-2,5-diyl, 1,3-dioxane-2,5-diyl, naphthalene-2,6-diyl, or 1,3-dioxaborinane-2,5-diyl;

M¹, M², M³, M⁴, identical or different, are —CO—O—, —O—CO—, —CH₂—O—, —O—CH₂—, —CH₂—CH₂—, or —C≡C—;

R³, R⁴, R⁶, R⁷, independently of one another, are H or straight-chain or branched alkyl having 1 to 10 carbon atoms or $R^3$ and $R^4$ together are also —$(CH_2)_4$—, or —$(CH_2)_5$— if bound as substituents to a dioxolane system;

$M^5$ is —$CH_2$—O—, —CO—O—, —O—$CH_2$—, —O—CO—.

7. A liquid crystal mixture as claimed in claim 5, wherein the symbols of the compound of the formula I have the following meaning:

$R^1$, $R^2$, independently of one another, are H, or straight-chain or branched (with or without the inclusion of an asymmetric carbon atom) alkyl having 1 to 16 carbon atoms, it also being possible for one —$CH_2$— group to be replaced by —O—, —CO—, —CO—O—, —O—CO—, —CH=CH—, $\triangle$ or —Si$(CH_3)_2$—, or are one of the following chiral groups:

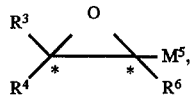
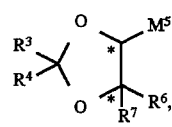
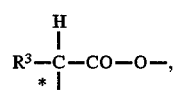
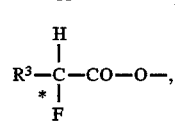

$A^1$, $A^2$, $A^3$, $A^4$, identical or different, are 1,4-phenylene, pyridazine-3,6-diyl, pyridine-2,5-diyl, pyrimidine-2,5-diyl, in which one or two hydrogen atoms can be replaced by F, trans-1,4-cyclohexylene, 1,3-dioxane-2,5-diyl, naphthalene-2,6-diyl or 1,3-dioxaborinane-2,5-diyl;

$M^1$, $M^2$, $M^3$, $M^4$, identical or different, are —CO—O—, —O—CO—, —O—$CH_2$—, —$CH_2$—$CH_2$—;

$R^3$, $R^4$, $R^6$, $R^7$, independently of one another, are H or straight-chain or branched alkyl having 1 to 10 carbon atoms or $R^3$ and $R^4$ together are also —$(CH_2)_4$—, or —$(CH_2)_5$— if bound as substituents to a dioxolane system;

$M^5$ is —$CH_2$—O—, —CO—O—, —O—$CH_2$—, —O—CO—.

8. A liquid crystal mixture as claimed in claim 5, wherein the symbols of the compound of the formula I have the following meaning:

$R^1$, $R^2$, independently of one another, are H or alkyl having 1 to 16 carbon atoms, it also being possible for one —$CH_2$— group to be replaced by —O—, —CO—O—, —O—CO— or $\triangle$, or are the chiral group

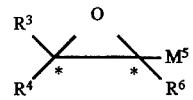

$A^1$, $A^2$, $A^3$, $A^4$, identical or different, are 1,4-phenylene, pyridazine-3,6-diyl, pyridine-2,5-diyl, pyrimidine-2,5-diyl, in which one or two hydrogen atoms can be replaced by F, trans-1,4-cyclohexylene, 1,3-dioxane-2,5-diyl, naphthalene-2,6-diyl or 1,3-dioxaborinane-2,5-diyl;

$M^1$, $M^2$, $M^3$, $M^4$, identical or different, are —CO—O—, —O—CO—, —O$CH_2$— or —$CH_2$—O—;

$R^3$, $R^4$, $R^6$, independently of one another, are H or a straight-chain alkyl having 1 to 10 carbon atoms;

$M^5$ is —$CH_2$—O— or —CO—O—.

9. A ferroelectric switching and display device comprising base plates, electrodes, at least one polarizer, at least one orientation layer and a liquid-crystalline medium, wherein the liquid-crystalline medium is a liquid crystal mixture as claimed in claim 5.

10. A fluoropyridine compound of the formula I

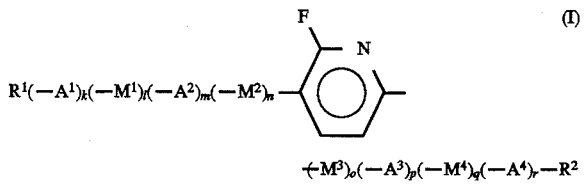

in which the symbols have the following meaning:

$R^1$, $R^2$, independently of one another, are H, or straight-chain or branched (with or without the inclusion of an asymmetric carbon atom) alkyl having 1 to 16 carbon atoms, it also being possible for one or two non-adjacent —$CH_2$— groups to be replaced by —O—, —S—, —CO—, —CO—O—, —O—CO—, —O—CO—O—, —CH=CH—, —C≡C—, $\triangle$ —Si$(CH_3)_2$—, and it also being possible for one or more hydrogen atoms of the alkyl radical to be substituted by F, Cl, Br or CN, or are one of the following chiral groups:

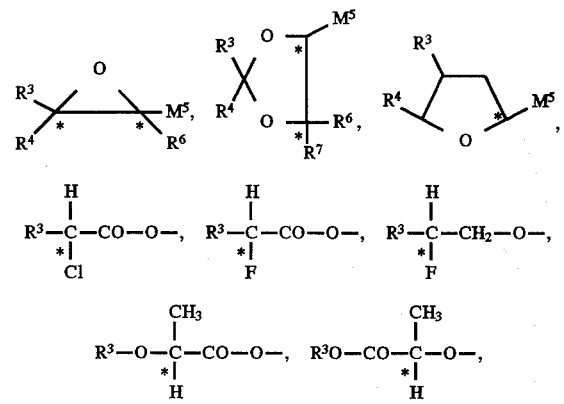

$A^1$, $A^2$, $A^3$, $A^4$, identical or different, are 1,4-phenylene, pyridazine-3,6-diyl, pyridine-2,5-diyl, pyrimidine-2,5-diyl, it being possible for one or two hydrogen atoms to be replaced by F, trans-1,4-cyclohexylene, in which one or two hydrogen atoms can be replaced by CN, 1,3,4-thiadiazole-2,5-diyl, 1,3-dioxane-2,5-diyl, naphthalene-2,6-diyl, or 1,3-dioxaborinane-2,5-diyl;

$M^1$, $M^2$, $M^3$, $M^4$, identical or different, are —CO—O—, —O—CO—, —$CH_2$—O—, —O—$CH_2$—, —$CH_2$—$CH_2$—, or —C≡C—;

$R^3$, $R^4$, $R^6$, $R^7$, independently of one another, are H or straight-chain or branched alkyl having 1 to 16 carbon atoms or $R^3$ and $R^4$ together are also —$(CH_2)_4$—, or —$(CH_2)_5$— if bound as substituents to a dioxolane system, $M^5$ is —$CH_2$—O—, —CO—O—, —O—$CH_2$—, —O—CO—, k, l, m, n, o, p, q, r are zero or one, with the proviso that the sum of k+m+p+r is less than 4 and greater than zero, and with the proviso that either a) $R^1$ or $R^2$ is H or a straight-chain or branched alkyl (with or without the inclusion of an asymmetric carbon atom) having 1 to 16 carbon atoms, in which one or two non-adjacent $CH_2$-groups are replaced by —C≡C—, △ or $Si(CH_3)_2$, or one of the following chiral groups:

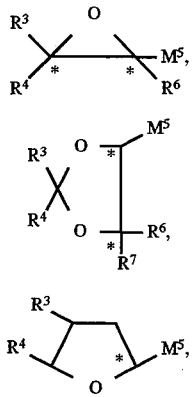

b) or at least one of $A^1$, $A^2$, $A^3$, $A^4$ is 1,3,4-thiadiazole-2,5-diyl or 1,3-dioxaborinane-2,5-diyl.

11. A fluoropyridine compound as claimed in claim 10, wherein the symbols of the compound of the formula I have the following meaning:

$R^1$, $R^2$, independently of one another, are H, or straight-chain or branched (with or without the inclusion of an asymmetric carbon atom) alkyl having 1 to 16 carbon atoms, it also being possible for one —$CH_2$— group to be replaced by —O—, —CO—, —CO—O—, —O—CO—, —O—CO—O—, —CH=CH—, —C≡C—, △ or —$Si(CH_3)_2$—, or are one of the following chiral groups:

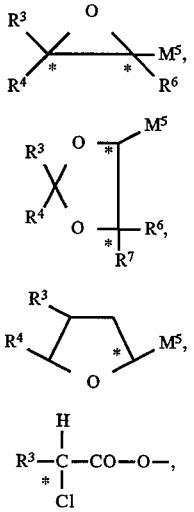

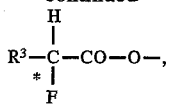

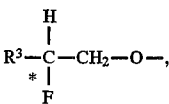

$A^1$, $A^2$, $A^3$, $A^4$, identical or different, are 1,4-phenylene, pyridazine-3,6-diyl, pyridine-2,5-diyl, pyrimidine-2,5-diyl, it being possible for one or two hydrogen atoms to be replaced by F, trans-1,4-cyclohexylene, 1,3,4-thiadiazole-2,5diyl, 1,3-dioxane-2,5-diyl, naphthalene-2,6-diyl, or 1,3-dioxaborinane-2,5-diyl;

$M^1$, $M^2$, $M^3$, $M^4$, identical or different, are —CO—O—, —O—CO—, —$C_2$—O—, —O—$CH_2$—, —$CH_2$—$CH_2$—, or —C≡C—;

$R^3$, $R^4$, $R^6$, $R^7$, independently of one another, are H or straight-chain or branched alkyl having 1 to 10 carbon atoms or $R^3$ and $R^4$ together are also —$(CH_2)_4$—, or —$(CH_2)_5$— if bound as substituents to a dioxolane system.

$M^5$ is —$CH_2$—O—, —CO—O—, —O—$CH_2$—, or —O—CO—.

12. A fluoropyridine compound as claimed in claim 10, wherein the symbols of the compound of the formula I have the following meaning:

$R^1$, $R^2$, independently of one another, are H, or straight-chain or branched (with or without the inclusion of an asymmetric carbon atom) alkyl having 1 to 16 carbon atoms, it also being possible for one —$CH_2$— group to be replaced by —O—, —CO—, —CO—O—, —O—CO—, —CH=CH—, △ or —$Si(CH_3)_2$—, or are one of the following chiral groups:

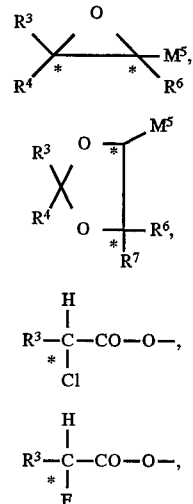

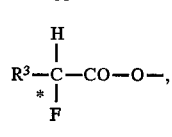

$A^1$, $A^2$, $A^3$, $A^4$, identical or different, are 1,4-phenylene, pyridazine-3,6-diyl, pyridine-2,5-diyl, pyrimidine-2,5-diyl, in which one or two hydrogen atoms can be replaced by F, trans-1,4-cyclohexylene, 1,3-dioxane-2,5-diyl, naphthalene-2,6-diyl, or 1,3-dioxaborinane-2,5-diyl;

$M^1$, $M^2$, $M^3$, $M^4$, identical or different, are —CO—O—, —O—CO—, —O—$CH_2$—, —$CH_2$—$CH_2$—;

R³, R⁴, R⁶, R⁷, independently of one another, are H or straight-chain or branched alkyl having 1 to 10 carbon atoms or R³ and R⁴ together are also —(CH₂)₄—, or —(CH₂)₅— if bound as substituents to a dioxolane system, M⁵ is —CH₂—O—, —CO—O—, —O—CH₂—, or —O—CO—.

13. A fluoropyridine compound as claimed in claim 10, wherein the symbols of the compound of the formula I have the following meaning:

R¹, R², independently of one another, are H or alkyl having 1 to 16 carbon atoms, it also being possible for one —CH₂— group to be replaced by —O—, —CO—O—, —O—CO— or Δ, or are the chiral group

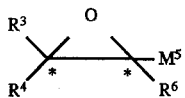

A¹, A², A³, A⁴, identical or different, are 1,4-phenylene, pyridazine-3,6-diyl, pyridine-2,5-diyl, pyrimidine-2,5-diyl, in which one or two hydrogen atoms can be replaced by F, trans-1,4-cyclohexylene, 1,3-dioxane-2,5-diyl, naphthalene-2,6-diyl or 1,3-dioxaborinane-2,5-diyl;

M¹, M², M³, M⁴, identical or different, are —CO—O—, —O—CO—, —O—CH₂— or —CH₂—O—;

R³, R⁴, R⁶, independently of one another, are H or a straight-chain alkyl having 1 to 10 carbon atoms;

M⁵ is —CH₂—O— or —CO—O—.

14. A ferroelectric switching and display device comprising base plates, electrodes, at least one polarizer, at least one orientation layer and a liquid-crystalline medium, wherein the liquid-crystalline medium is a liquid crystal moisture as claimed in claim 10.

15. A ferroelectric liquid crystal mixture, which comprises at least two components, which liquid crystal mixture contains, as one component, a compound of the formula I

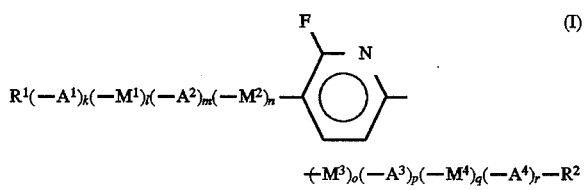

in which the symbols have the following meaning:

R¹, R², independently of one another, are H, or straight-chain or branched (with or without the inclusion of an asymmetric carbon atom) alkyl having 1 to 16 carbon atoms, it also being possible for one or two non-adjacent —CH₂— groups to be replaced by —O—, —CO—, —CO—O—, —O—CO—, —O—CO—O—, —CH=CH—, —C≡C—, Δ or —Si(CH₃)₂—, and it also being possible for one or more hydrogen atoms of the alkyl radical to be substituted by F, or are one of the following chiral groups:

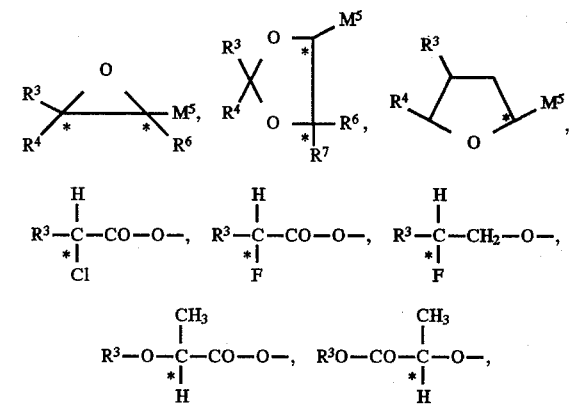

A¹, A², A³, A⁴, identical or different, are 1,4-phenylene, pyridazine-3,6-diyl, pyridine-2,5-diyl, pyrimidine-2,5-diyl, it being possible for one or two hydrogen atoms to be replaced by F, trans-1,4-cyclohexylene, in which one or two hydrogen atoms can be replaced by CN, 1,3,4-thiadiazole-2,5-diyl, 1,3-dioxane-2,5-diyl, naphthalene-2,6-diyl, or 1,3-dioxaborinane-2,5-diyl;

M¹, M², M³, M⁴, identical or different, are —CO—O—, —O—CO—, —CH₂—O—, —O—CH₂—, —CH₂—CH₂—, or —C≡C—;

R³, R⁴, R⁶, R⁷, independently of one another, are H or straight-chain or branched alkyl having 1 to 16 carbon atoms or R³ and R⁴ together are also —(CH₂)₄—, or —(CH₂)₅— if bound as substituents to a dioxolane system, M⁵ is —CH₂—O—, —CO—O—, —O—CH₂, —O—CO—, k, l, m, n, o, p, q, r are zero or one, with the proviso that the sum of k+m+p+r is less than 4 and greater than zero, and with the proviso that either a) R¹ or R² is H or a straight-chain or branched alkyl (with or without the inclusion of an asymmetric carbon atom) having 1 to 16 carbon atoms, in which one or two non-adjacent CH₂-groups are replaced by —C≡C—, Δ or Si(CH₃)₂, or one of the following chiral groups:

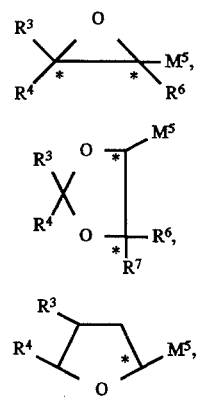

b) or at least one of A¹, A², A³, A⁴ is 1,3,4-thiadiazole-2,5-diyl or 1,3-dioxaborinane-2,5-diyl.

16. A liquid crystal mixture as claimed in claim 15, wherein the symbols of the compound of the formula I have the following meaning:

R¹, R², independently of one another, are H, or straight-chain or branched (with or without the inclusion of an asymmetric carbon atom) alkyl having 1 to 16 carbon atoms, it also being possible for one —$CH_2$— group to be replaced by —O—, —CO—, —CO—O—, —O—CO—, —O—CO—O—, —CH=CH—, —C≡C—, △ or —$Si(CH_3)_2$—, or are one of the following chiral groups:

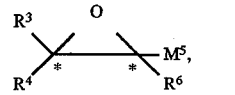

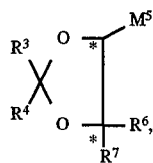

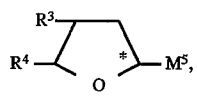

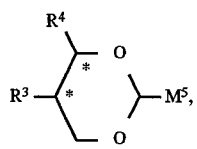

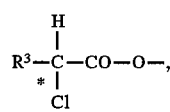

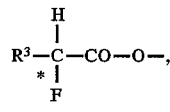

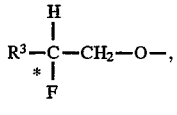

$A^1, A^2, A^3, A^4$, identical or different, are 1,4-phenylene, pyridazine-3,6-diyl, pyridine-2,5-diyl, pyrimidine-2,5-diyl, it being possible for one or two hydrogen atoms to be replaced by F, trans-1,4-cyclohexylene, 1,3,4-thiadiazole-2,5-diyl, 1,3-dioxane-2,5-diyl, naphthalene-2,6-diyl, or 1,3-dioxaborinane-2,5-diyl;

$M^1, M^2, M^3, M^4$, identical or different, are —CO—O—, —O—CO—, —$CH_2$—O—, —O—$CH_2$—, —$CH_2$—$CH_2$—, or —C≡C—;

$R^3, R^4, R^6, R^7$, independently of one another, are H or straight-chain or branched alkyl having 1 to 10 carbon atoms or $R^3$ and $R^4$ together are also —$(CH_2)_4$—, or —$(CH_2)_5$— if bound as substituents to a dioxolane system;

$M^5$ is —$CH_2$—O—, —CO—O—, —O—$CH_2$—, or —O—CO—.

17. A liquid crystal mixture as claimed in claim 15, wherein the symbols of the compound of the formula I have the following meaning:

$R^1, R^2$, independently of one another, are H, or straight-chain or branched (with or without the inclusion of an asymmetric carbon atom) alkyl having 1 to 16 carbon atoms, it also being possible for one —$CH_2$— group to be replaced by —O—, —CO—, —CO—O—, —O—CO—, —CH=CH—, △ or —$Si(CH_3)_2$—, or are one of the following chiral groups:

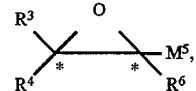

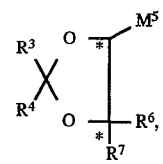

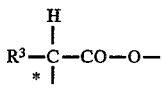

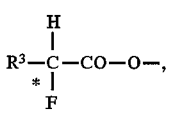

$A^1, A^2, A^3, A^4$, identical or different, are 1,4-phenylene, pyridazine-3,6-diyl, pyridine-2,5-diyl, pyrimidine-2,5-diyl, in which one or two hydrogen atoms can be replaced by F, trans-1,4-cyclohexylene, 1,3-dioxane-2,5-diyl, naphthalene-2,6-diyl or 1,3-dioxaborinane-2,5-diyl;

$M^1, M^2, M^3, M^4$, identical or different, are —CO—O—, —O—CO—, —O—$CH_2$—, or —$CH_2$—$CH_2$—;

$R^3, R^4, R^6, R^7$, independently of one another, are H or straight-chain or branched alkyl having 1 to 10 carbon atoms or $R^3$ and $R^4$ together are also —$(CH_2)_4$—, or —$(CH_2)_5$— if bound as substituents to a dioxolane system;

$M^5$ is —$CH_2$—O—, —CO—O—, —O—$CH_2$—, or —O—CO—.

18. A liquid crystal mixture as claimed in claim 15, wherein the symbols of the compound of the formula I have the following meaning:

$R^1, R^2$, independently of one another, are H or alkyl having 1 to 16 carbon atoms, it also being possible for one —$CH_2$— group to be replaced by —O—, —CO—O—, —O—CO— or △ or are the chiral group

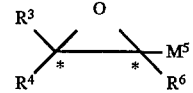

$A^1, A^2, A^3, A^4$, identical or different, are 1,4-phenylene, pyridazine-3,6-diyl, pyridine-2,5-diyl, pyrimidine-2,5-diyl, in which one or two hydrogen atoms can be replaced by F, trans-1,4-cyclohexylene, 1,3-dioxane-2,5-diyl, naphthalene-2,6-diyl, or 1,3-dioxaborinane-2,5-diyl;

$M^1, M^2, M^3, M^4$, identical or different, are —CO—O—, —O—CO—, —$OCH_2$— or —$CH_2$—O—;

$R^3, R^4, R^6$, independently of one another, are H or a straight-chain alkyl having 1 to 10 carbon atoms;

$M^5$ is —$CH_2$—O— or —CO—O—.

* * * * *